US010852771B2

(12) United States Patent
Allen et al.

(10) Patent No.: US 10,852,771 B2
(45) Date of Patent: Dec. 1, 2020

(54) SYSTEMS AND METHODS ASSOCIATED WITH SMART DEVICES

(71) Applicant: iDevices, LLC, Avon, CT (US)

(72) Inventors: Christopher Allen, West Hartford, CT (US); Michael Daigle, Glastonbury, CT (US); Daniel Gould, East Hampton, CT (US); Timothy Corcoran Repp, Barkhamsted, CT (US); Jeffrey Scarcella, Tariffville, CT (US); Michael Tetreault, Simsbury, CT (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 16/543,872

(22) Filed: Aug. 19, 2019

(65) Prior Publication Data

US 2019/0369673 A1 Dec. 5, 2019

Related U.S. Application Data

(63) Continuation of application No. 15/860,274, filed on Jan. 2, 2018, now Pat. No. 10,386,891.
(Continued)

(51) Int. Cl.
*G06F 1/16* (2006.01)
*F16M 13/02* (2006.01)
(Continued)

(52) U.S. Cl.
CPC ........... *G06F 1/1656* (2013.01); *F16M 13/02* (2013.01); *G01C 9/00* (2013.01); *G06F 1/1626* (2013.01);
(Continued)

(58) Field of Classification Search
CPC ...... G06F 1/1626; G06F 1/1656; A47G 1/175
(Continued)

(56) References Cited

U.S. PATENT DOCUMENTS 6,231,962 B1 * 5/2001 Bries .................. A47G 1/175
428/317.3
7,506,450 B2 3/2009 Spaulding
(Continued)

OTHER PUBLICATIONS

International Search Report and Written Opinion of the International Searching Authority for International Application No. PCT/US2018/012018, dated Mar. 29, 2018, 9 pages.
(Continued)

*Primary Examiner* — Anthony Q Edwards
(74) *Attorney, Agent, or Firm* — Michael Best & Friedrich, LLP

(57) ABSTRACT

A system which in some embodiments comprises a wireless smart device assembly that includes a smart device, wherein the smart device assembly is attachable or mountable against an unopened surface of a wall or other structure. In some embodiments, a system comprises a smart device assembly that includes a smart device; and a fastener that includes adhesive and is coupled to the smart device assembly and releasably attachable to a wall or other structure. Some embodiments include a level indicator configured to indicate the angular position or orientation of one or more other portion of the smart device assembly relative to parallel and/or plumb to the force of gravity. In some embodiments, a mount and/or a cover define a catch to releasably attach the cover to the mount.

17 Claims, 14 Drawing Sheets

Related U.S. Application Data

(60) Provisional application No. 62/441,550, filed on Jan. 2, 2017.

(51) Int. Cl.
| | | |
|---|---|---|
| *H01H 1/10* | (2006.01) | |
| *H04L 12/00* | (2006.01) | |
| *G06F 1/18* | (2006.01) | |
| *G08C 13/00* | (2006.01) | |
| *G01C 9/00* | (2006.01) | |

(52) U.S. Cl.
CPC .............. *G06F 1/182* (2013.01); *G08C 13/00* (2013.01); *H01H 1/10* (2013.01); *H04L 12/00* (2013.01)

(58) Field of Classification Search
USPC ................ 361/679.55, 679.56; 312/293.3
See application file for complete search history.

(56) References Cited

U.S. PATENT DOCUMENTS

| | | | |
|---|---|---|---|
| 8,389,857 B2 | 3/2013 | Petrillo | |
| 8,544,805 B2 | 10/2013 | Virgin | |
| 8,708,305 B2 * | 4/2014 | McGreevy | A47G 1/175 |
| | | | 248/683 |
| 9,543,082 B1 | 1/2017 | Wengreen | |
| 9,699,870 B2 | 7/2017 | Altonen | |
| 9,818,559 B2 | 11/2017 | Tress | |
| 9,978,547 B1 | 5/2018 | Wisniewski | |
| 10,386,891 B2 * | 8/2019 | Allen | H04L 12/00 |
| 2004/0084598 A1 * | 5/2004 | Dodig, Jr. | A47G 1/20 |
| | | | 248/475.1 |
| 2004/0123503 A1 | 7/2004 | Pitzen | |
| 2005/0256254 A1 | 11/2005 | Luhmann | |
| 2007/0102601 A1 | 5/2007 | Thompson | |
| 2009/0251352 A1 | 10/2009 | Altonen | |
| 2011/0290965 A1 | 12/2011 | Virgin | |
| 2011/0303814 A1 | 12/2011 | Schultz | |
| 2013/0068712 A1 | 3/2013 | Kwok et al. | |
| 2013/0264925 A1 | 10/2013 | Kling | |
| 2015/0083615 A1 * | 3/2015 | Lay | G06F 1/1616 |
| | | | 206/45.24 |
| 2015/0305502 A1 | 10/2015 | Wengreen | |
| 2016/0041584 A1 | 2/2016 | DeSilva | |
| 2016/0246328 A1 * | 8/2016 | Christie, II | G06F 1/1632 |
| 2016/0306384 A1 | 10/2016 | Carvey | |

OTHER PUBLICATIONS

Lutron Electronics Co., Inc., Brochure, print out of http://cdn-docs.av-iq.com/brochure/PD_Series_Brochure.pdf, dated Jul. 2014, 6 pages.

Skylink Group, Manual, print out of http://www.skylinkstore.com/docs/manuals/lc/mTB318v1.9.pdf, dated 2010, 2 pages.

Philips Lighting Holding B.V., Leaflet, print out of https://media1.bauhaus.se/media/pdf/2148844C.pdf, dated Jul. 11, 2016, 2 pages.

\* cited by examiner

SYSTEMS AND METHODS ASSOCIATED WITH SMART DEVICES

CROSS-REFERENCE TO RELATED APPLICATIONS

The present application is a continuation of U.S. Application Ser. No. 15/860,274 having a filing date of Jan. 2, 2018, which claims the benefit of priority of U.S. Provisional Patent Application Ser. No. 62/441,550, filed Jan. 2, 2017, entitled "Systems and Methods Associated with Smart Devices." Applicant claims priority to and benefit of all such applications and incorporates all such applications herein by reference.

FIELD OF THE INVENTION

The present invention relates generally to systems and methods associated with smart devices.

BACKGROUND OF THE INVENTION

It is known to mount a smart device, such as but not limited to single or double on/off toggle switches, paddle or rocker switches, single or double pole dimmer switches and wall outlets (each of which may be referred to as a "smart switch") within or to an electrical box mounted within a wall.

SUMMARY OF THE INVENTION

Some smart devices assemblies are wireless (i.e., they do not have electrical connections to wires external to the smart device assembly) and portable.

It would be advantageous to have the ability to mount such smart device assemblies to a wall or other structure without requiring that its smart device be mounted in the wall or other structure.

The ability to mount the smart device assembly on the wall rather than in the wall would reduce damage to the wall or other structure, and thus reduce the amount of repair that may be needed, in the event that the smart device assembly is removed and/or moved to another location. It would also reduce cost associated with an installation or renovations, i.e., snaking electrical wires.

It is an object of at least some embodiments to address one or more of the above technical challenges.

In one aspect, a system comprises a wireless smart device assembly that includes a smart device, wherein the smart device assembly is attachable or mountable on or to an unopened surface of a wall or other structure by one or more fasteners.

In at least some embodiments, the ability to mount the smart device assembly on the wall or other structure rather than in the wall or other structure eases installation (compared to a conventional device/installation that mounts the device in or to an electrical box mounted in a wall), as there is no need to cut a hole in the wall or mount an electrical box in the wall or locate the smart device where an in-wall electrical box is already present, which would limit location flexibility. It may also reduce or eliminate damage to the wall or other structure, and thus reduce or eliminate the amount of repair that may be needed, in the event that the smart device assembly is removed and/or moved to another location. Moreover, since it does not need to be mounted to an electrical box mounted in a wall, in at least some embodiments, it is possible to use the smart device assembly even where it is not possible to mount an electrical box in a wall or where it is not practical or feasible to run electrical wires. Thus, in some embodiments, the smart device assembly may be used without being attached to a wall or other structure, for example, it may be used while it is resting on the surface of a desk and/or being held by a user.

In some embodiments, with the possible exception of fasteners (e.g., nails, bolts, screws), no part of the smart device assembly extends into the wall (i.e., beyond the surface of the wall).

In some embodiments, the one or more fasteners comprise an at least partly adhesive fastener coupled to the smart device assembly and attachable to the wall or other structure.

In some embodiments, the at least partly adhesive fastener comprises pressure sensitive adhesive.

In some embodiments, the fastener(s) comprises: a substrate having a front surface and a back surface, the front surface coupled to the smart device assembly, the back surface facing away from the smart device assembly; and pressure sensitive adhesive disposed on at least a portion of the back surface.

In some embodiments, the system further comprises a tab configured to be pulled to apply at least shear force to the at least partly adhesive fastener and thereby cause release of the at least partly adhesive fastener from the wall and/or other structure.

In some embodiments, the wireless smart device assembly comprises: a mount coupled to the smart device; and a cover coupled to the mount and covering at least a portion of the mount.

In some embodiments, the mount has a longitudinal axis and the fastener extends along at least a portion of the longitudinal axis.

In some embodiments, at least a portion of the tab is aligned with at least a portion of the longitudinal axis.

In some embodiments, the mount defines an opening at least a portion of which is aligned with at least a portion of the tab.

In some embodiments, the tab extends through the opening.

In some embodiments, the mount includes an access door that is removable by a user to access the tab.

In some embodiments, the least partly adhesive fastener is configured to releasably attach the smart device assembly to the wall and/or other structure without a need for any other fasteners.

In some embodiments, the smart device assembly comprises a smart switch to control another device or appliance.

In another aspect, a system comprises a smart device assembly that includes a smart device; and a fastener that includes adhesive and is coupled to the smart device assembly and releasably attachable to a wall or other structure.

In at least some embodiments, the use of a fastener that includes adhesive and is releasably attachable to the wall or other structure eases installation (compared to a conventional device/installation that mounts the device in or to an electrical box mounted in a wall), as there is no need to cut a hole in the wall or mount an electrical box in the wall or locate the device where an electrical box is already located. It may also reduce or eliminate damage to the wall or other structure, and/or any repair that may be needed, in the event that the smart device assembly is removed and/or moved to another location.

In at least some embodiments, the releasably attachable adhesive holds the smart device assembly to the surface of the wall but releases without damaging the wall (e.g., removing the paint or the surface of the wall).

Moreover, since it does not need to be mounted to an electrical box mounted in a wall, in at least some embodiments, it is possible to use the smart device assembly even where it is not possible to mount an electrical box in a wall. Thus, in some embodiments, the smart device assembly may be used without being attached to a wall or other structure, for example, it may be used while it is resting on the surface of a desk and/or being held by a user.

In some embodiments, the adhesive may comprise pressure sensitive adhesive.

In some embodiments, the fastener may comprise: a substrate having a front surface and a back surface, the front surface facing toward the smart device assembly, the back surface facing away from the smart device assembly; and pressure sensitive adhesive disposed on at least a portion of the back surface.

In some embodiments, the system further comprises a tab configured to be pulled to apply at least shear force to the fastener and thereby cause release of the fastener from the wall and/or other structure.

In some embodiments, the wireless smart device assembly comprises: a mount coupled to the smart device; and a cover coupled to the mount and covering at least a portion of the mount.

In some embodiments, the mount has a longitudinal axis and the fastener extends along at least a portion of the longitudinal axis.

In some embodiments, at least a portion of the tab is aligned with at least a portion of the longitudinal axis.

In some embodiments, the mount defines an opening at least a portion of which is aligned with at least a portion of the tab.

In some embodiments, the tab extends through the opening.

In some embodiments, the fastener is configured to releasably attach the smart device assembly to the wall and/or other structure without a need for any other fasteners.

In some embodiments, the smart device may comprise a smart switch to control another device or appliance.

In another aspect, a system may comprise a wireless smart device assembly that includes a smart device and a level indicator configured to indicate the angular position or orientation of one or more other portion of the smart device assembly relative to parallel and/or plumb to the force of gravity.

In at least some embodiments, the level reduces the difficulty encountered by a user when trying to mount the smart device assembly on a wall rather than in or to an electrical box mounted in a wall. In at least some embodiments, the benefit may be multiplied many times over and may become a matter of great convenience to a user due to the fact that the smart device assembly is portable, and consequently, a single smart device may be mounted, detached and re-mounted multiple times over the course of its life.

In another aspect, a system may comprise a wireless smart device assembly that includes a smart device, a mount and a cover, wherein the mount and/or the cover define a catch to releasably attach the cover to the mount.

In at least some embodiments, the catch may be readily disengaged, without tools, to allow the cover to be detached from the mount and thereby facilitate access to the smart device and/or batteries that may provide power thereto.

In another aspect, a method comprises providing a smart device assembly in accordance with any smart device assembly mentioned above or otherwise disclosed herein; and attaching or mounting the smart device assembly to an unopened surface of a wall or other structure.

In some embodiments, the smart device assembly comprises any smart device assembly mentioned above or otherwise disclosed herein.

In another aspect, a method comprises removing a cover of a smart device assembly that is attached or mounted to a wall or other structure at least in part by a fastener; and pulling a tab to apply at least shear force to the fastener and thereby cause release of the fastener from the wall or other structure.

In some embodiments, the smart device assembly comprises any smart device assembly mentioned above or otherwise disclosed herein.

Other objects, features and/or advantages will become apparent in view of the following detailed description of the embodiments and the accompanying drawings.

However, while various objects, features and/or advantages have been described in this Summary and/or will become more readily apparent in view of the following detailed description and accompanying drawings, it should be understood that such objects, features and/or advantages are not required in all aspects and embodiments.

This Summary is not exhaustive of the scope of the present aspects and embodiments. Thus, while certain aspects and embodiments have been presented and/or outlined in this Summary, it should be understood that the present aspects and embodiments are not limited to the aspects and embodiments in this Summary. Indeed, other aspects and embodiments, which may be similar to and/or different from, the aspects and embodiments presented in this Summary, will be apparent from the description, illustrations and/or claims, which follow.

It should also be understood that any aspects and embodiments that are described in this Summary and do not appear in the claims that follow are preserved for later presentation in this application or in one or more continuation patent applications.

It should also be understood that any aspects and embodiments that are not described in this Summary and do not appear in the claims that follow are also preserved for later presentation or in one or more continuation patent applications.

DETAILED DESCRIPTION OF EMBODIMENTS

Figure 1:
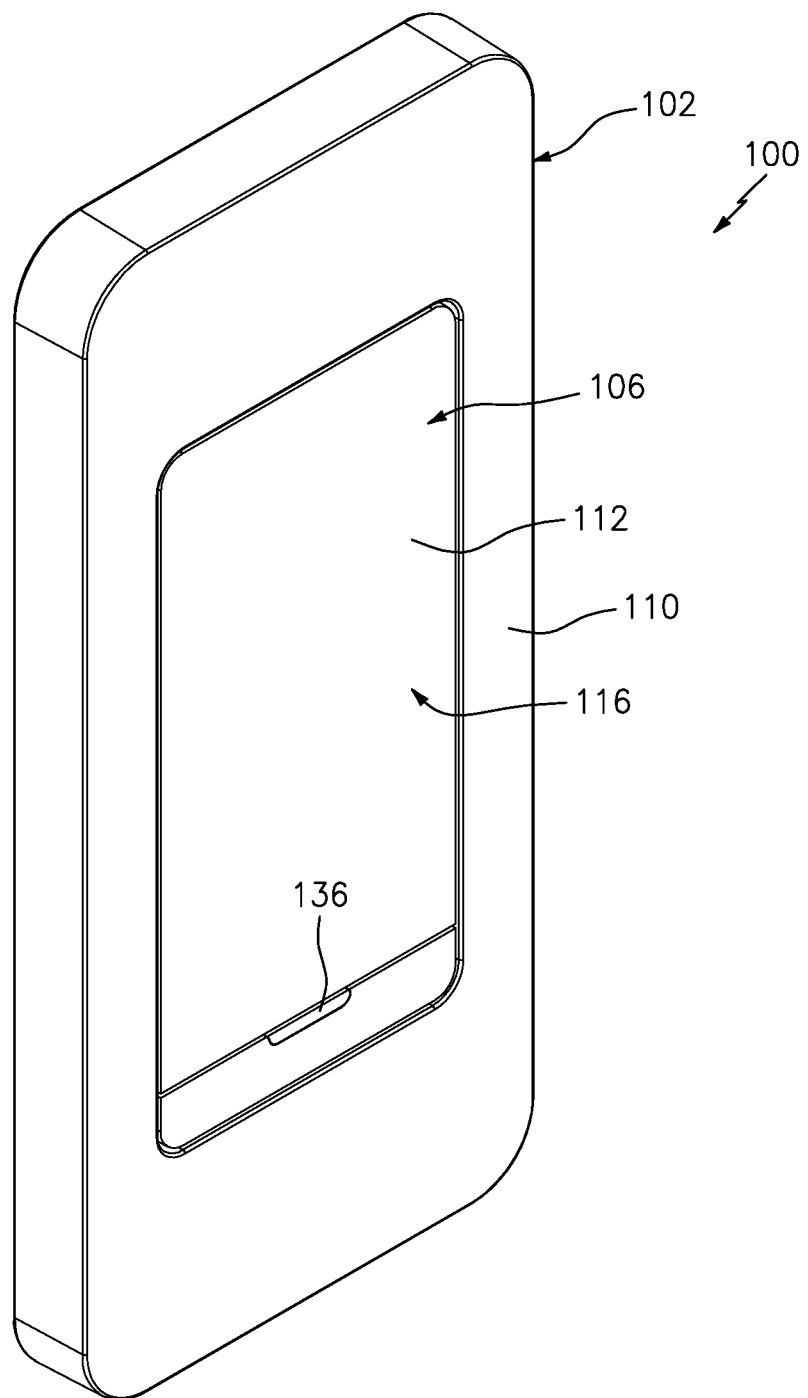
FIG. 1 is a front perspective view of a wireless control system.
Figure 2:
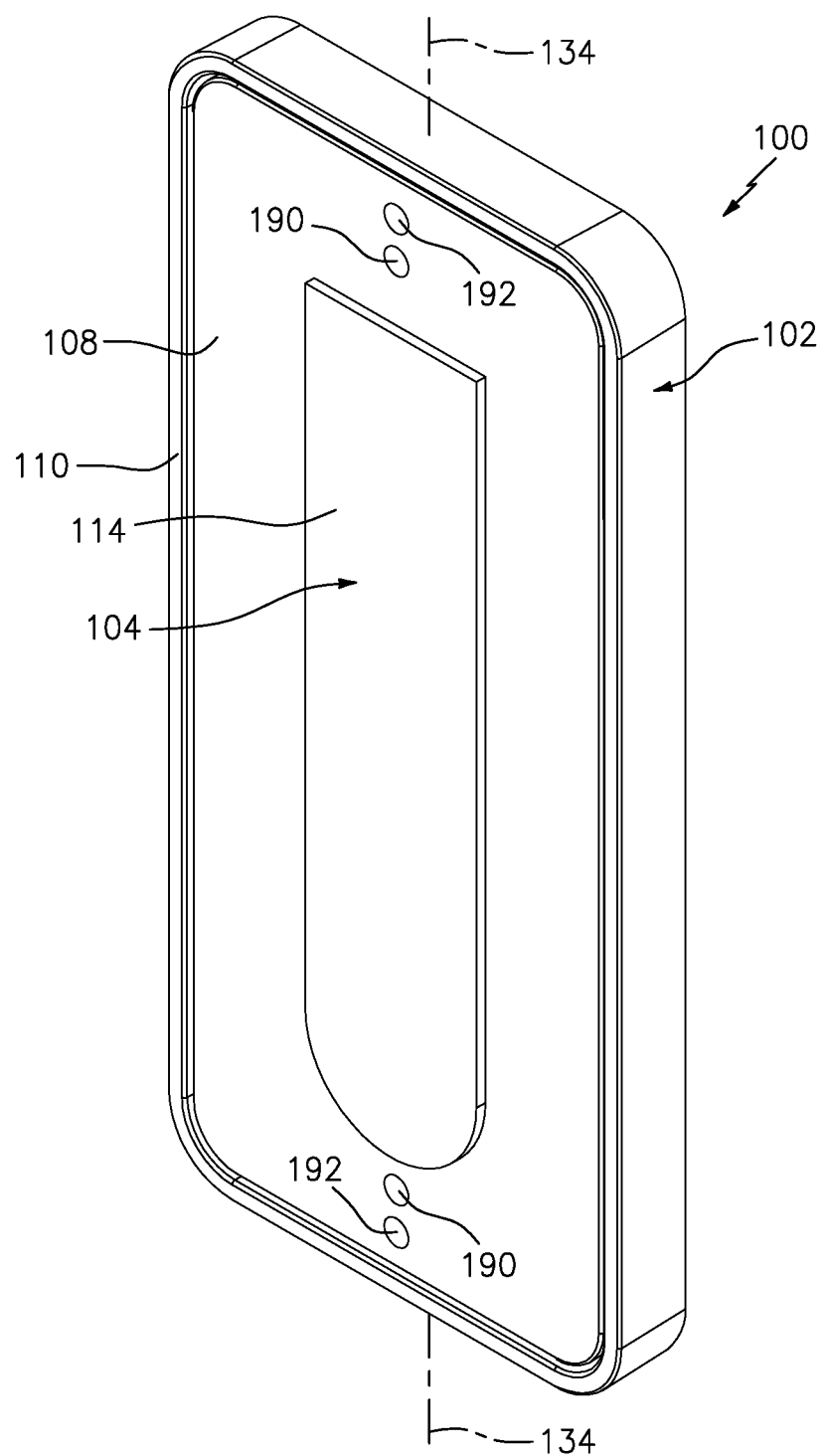
FIG. 2 is a rear perspective view of the system of FIG. 1.

FIGS. 1-2 are perspective views of a wireless control system 100 for use in mounting a smart device to a wall and/or other structure. The system 100 includes a smart device assembly 102 and a fastener 104.

The smart device assembly 102 may comprise a smart device 106, a mount 108 and a cover 110. As will be further discussed below, the smart device 106 may comprise a smart switch (which is shown as, but not limited to, a smart paddle or rocker switch) or any other type of smart device. The mount 108 may have the form of a mounting plate as shown and/or any other type of mount and may be configured to be attached to a wall (and/or other structure) and/or to support (directly and/or indirectly) one or more other portions of the smart device assembly 102. The cover 110 may have the form of a wall or cover plate, as shown, and/or any other type of cover and may be configured to be attached or otherwise coupled to the mount 108 and/or to cover one or more other portions of the smart device assembly 102. The mount 108 and the cover 110 may each be a single integral part or an assembly of multiple parts.

In accordance with at least some embodiments, the smart device assembly 102 may be a wireless smart device assembly (i.e., it does not have electrical connections to wires external to the smart device assembly). Thus, in at least some embodiments, the smart device assembly 102 is not electrically connected to and/or provides electrical power to any external devices. Instead, as will be further described below, the smart device assembly 102 may be used to communicate with one or more other smart devices using one or more wireless communication interface and one or more wireless communication protocol to remotely control and/or otherwise interact with such one or more other smart device(s). In some embodiments, for example, the smart device assembly 102 may be used to remotely control one or more smart devices that are arranged to supply electrical power to one or more other devices (e.g., one or more electric lights). To that effect, in at least some embodiments, the smart device 106 may include a manually engageable actuator 112, which may be disposed in or otherwise aligned with an opening 116 defined by the cover 110, that may allow a user to manually indicate commands the user may wish to have communicated to one or more other smart devices. As will be further described below, in some embodiments, the manually engageable actuator 112 may allow a user to remotely change an on/off state of a smart switch arranged to supply electrical power to one or more other devices. In some embodiments, the manually engageable actuator 112 may allow a user to control another operation of a remote, e.g., smart, device other than electrical power supply and/or an on/off state.

The fastener 104 may comprise any type of fastener(s) or fastening mechanism, which may include but are not limited to nails, bolts, screws, clips, Velcro, adhesive (including epoxy adhesives). In some embodiments, the fastener 104 comprises an at least partly adhesive fastener 114 (referred to hereinafter for conciseness as "adhesive fastener 114") that includes adhesive. In some of such embodiments, the adhesive fastener 114 may comprise a double sided, releasably attachable adhesive strip, such as a Command™ strip by 3M™.

Figure 3:
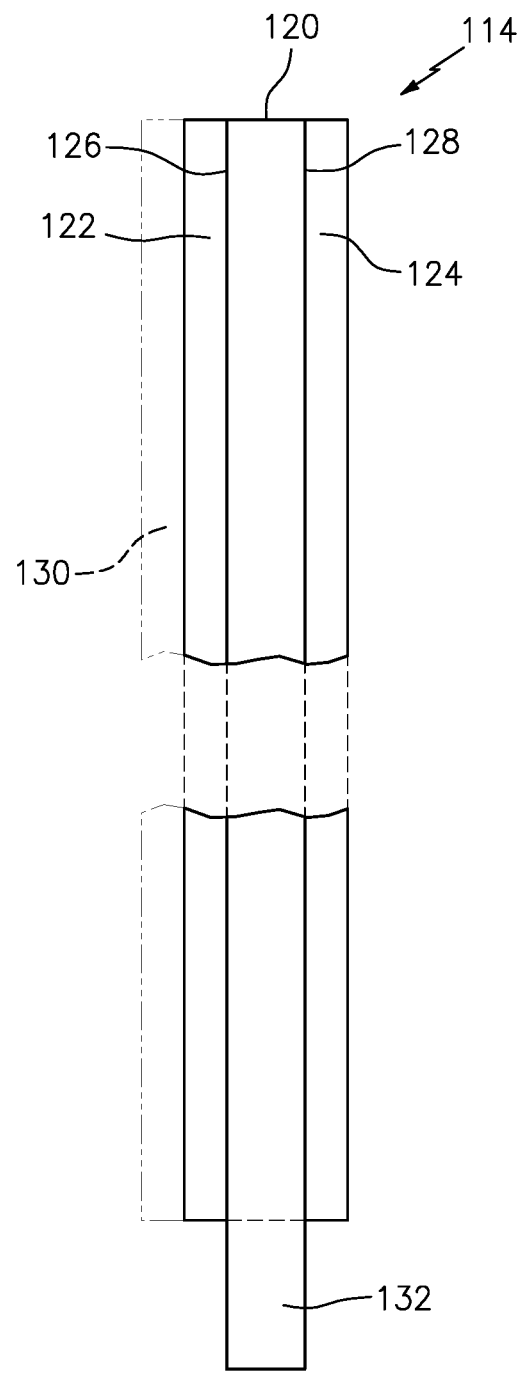
FIG. 3 is a schematic enlarged side view of the fastening mechanism of the system of FIG. 1.

FIG. 3 is a schematic enlarged side view of the adhesive fastener 114. In some embodiments, the fastener shown in FIG. 3 has the form of a Command™ strip by 3M™ or a variation thereof. Referring to FIG. 3, in accordance with some embodiments, the adhesive fastener 114 may include a substrate 120 and adhesive 122, 124. The substrate 120 may have a first surface 126 (sometimes referred to herein as back surface 126) and a second surface 128 (sometimes referred to herein as front surface 128). The adhesive 122 may be disposed on at least a portion of the first surface 126 and may releasably attach the device 102 to a wall and/or other structure. The adhesive 124 may be disposed on at least a portion of the second surface 128 to releasably attach or otherwise couple the adhesive fastener 114 to the smart device assembly 102. In some embodiments, the adhesive 122 and/or the adhesive 124 may comprise pressure sensitive adhesive. In some embodiments, the substrate 120, the adhesive 122 and/or the adhesive 124 may have a relatively high tensile strength (in a direction perpendicular to one of the surfaces 126, 128 of the substrate 120) but relatively low shear strength (in a direction parallel to or along one of the surfaces 126, 128 of the substrate 120). In some embodiments, the substrate 120 may be and/or comprise a material that is stretchable and/or otherwise deformable. As will be discussed below, in some embodiments, this may reduce the amount of shear force required to cause or otherwise facilitate release of the adhesive fastener 114 from a wall and/or other structure.

The system 100 may further include a releasable sheet 130 that is disposed on the adhesive fastener 114 and peelable or otherwise removable therefrom, e.g., by a user, prior to releasably attaching the adhesive fastener 114 to a wall and/or other structure.

In some situations, a user may seek to release the adhesive fastener 114 from a wall and/or other structure to which the smart device assembly 102 has been mounted. To that effect, the adhesive fastener 114 may include a tab 132 that may be pulled, by a user, in a direction that results in application of shear force (in a direction parallel to one of the surfaces 126, 128 of the substrate 120) to the adhesive fastener 114, to thereby cause or otherwise facilitate release of the adhesive fastener 114 from a wall and/or other structure to which the smart device assembly 102 has been mounted. A difference in the tensile and shear strengths may be selected so that a user may apply sufficient shear force to the adhesive to separate the adhesive from the wall or surface, yet retain sufficient gripping force (e.g., in a tensile direction) to securely retain the device to the wall or other structure. That is, the difference in tensile and shear strengths permit the device to be securely retained on a surface yet be removed by a user. In at least some embodiments, the amount of shear force required to cause or otherwise facilitate release of the adhesive fastener 114 from a wall and/or other structure is selected such that it is able to be delivered by a typical user and does not damage the wall and/or and does not damage the smart device.

In some embodiments, the force may also cause release of the adhesive fastener 114 from the smart device assembly 102. In some embodiments, the tab 132 may be formed of a flexible and/or polymeric material. In some embodiments, the substrate 120 may deform when the shear force is applied thereto. In some embodiments, this may reduce the amount of shear force required to cause or otherwise facilitate release of the adhesive fastener 114 from a wall and/or other structure. In some embodiments, the tab 132 may be integral with and/or otherwise attached to the substrate 120.

In at least some embodiments, the ability to mount the smart device assembly on the wall or other structure rather than in the wall or other structure eases installation (compared to a conventional device/installation that mounts the device in an electrical box mounted in a wall), as there is no need for an electrical box mounted in a wall and thus no need to cut a hole in the wall or mount an electrical box in the wall, or mount the smart device where an electrical box already exists. It may also reduce or eliminate damage to the wall or other structure, and thus reduce or eliminate the amount of repair that may be needed, in the event that the smart device assembly is removed and/or moved to another location. In at least some embodiments, with the possible exception of fasteners (e.g., nails, bolts, screws), no part of the smart device assembly extends into the wall (i.e., beyond the surface of the wall). Moreover, since it does not need to be mounted to an electrical box mounted in a wall, in at least some embodiments, it is possible to use the smart device assembly even where it is not possible to mount an electrical box in a wall (or feasible to run electrical wires). Thus, in some embodiments, the smart device assembly may be used without being attached to a wall or other structure, for example, it may be used while it is resting on the surface of a desk and/or being held by a user.

In at least some embodiments, the use of a fastener that includes adhesive and is releasably attachable to the wall or other structure may further ease installation and may tend to further reduce or eliminate damage to the wall or other structure, and/or any repair that may be needed, in the event that the smart device assembly is removed and/or moved to another location. In at least some embodiments, with the use of a fastener that includes adhesive, no part of the smart device assembly extends into the wall (i.e., beyond the surface of the wall).

In at least some embodiments, the releasably attachable adhesive holds the smart device assembly to the surface of the wall but releases without damaging the wall (e.g., removing the paint or the surface of the wall). Those of ordinary skill in the art should understand how to select an adhesive that achieves this. The Command™ strip by 3M™ is one such embodiment.

In at least some embodiments, a method comprises providing a smart device assembly in accordance with any smart device assembly mentioned above or otherwise disclosed herein and attaching or mounting the smart device assembly to an unopened surface of a wall or other structure. In at least some embodiments, the smart device assembly comprises any smart device assembly mentioned above or otherwise disclosed herein.

In at least some embodiments, a method comprises removing a cover of a smart device assembly that is attached or mounted to a wall or other structure at least in part by a fastener, and pulling a tab to apply at least shear force to the fastener and thereby cause release of the fastener from the wall or other structure. In at least some embodiments, the smart device assembly comprises any smart device assembly mentioned above or otherwise disclosed herein.

Referring again to FIGS. 1-2, one or more of the above-described portions of the system 100 (the smart device assembly 102, the adhesive fastener 114, the smart device 106, the mount 108 and/or the cover 110) may have and/or extend along a longitudinal axis 134 (or a portion thereof). In some embodiments, at least a portion of one or more of the above-described portions of the system 100 (the smart device assembly 102, the adhesive fastener 114, the smart device 106, the mount 108 and/or the cover 110) may be aligned with the longitudinal axis 134. In some embodiments, one or more of the above-described portions of the system 100 (the smart device assembly 102, the adhesive fastener 114, the smart device 106, the mount 108 and/or the cover 110) may be symmetrical about the longitudinal axis 134.

In some embodiments, at least a portion of the tab 132 may be aligned with the longitudinal axis 134 and/or may be configured to be pulled in the direction of (or at least mostly in the direction of) the longitudinal axis 134 in order to help maximize the shearing effect of the shear force applied to the fastener 114 for a given area of the fastener adhering the device to the wall or other surface.

In some embodiments, the smart device 106 may further include a built-in lighting system that includes a light 136, as shown in FIG. 1. The built-in lighting system may have features and/or may have methods of operation that are the same as or similar to (sometimes referred to herein as at least similar to) one or more features and/or one or more methods of operation in one or more embodiments of one or more lighting systems, or portion(s) thereof, built into one or more smart devices disclosed in any of the co-pending patent applications disclosed below, each of which is hereby expressly incorporated by reference in its entirety as part of the present disclosure: (i) U.S. patent application Ser. No. 14/823,732, filed Aug. 11, 2015, entitled "Multifunction Pass-Through Wall Power Plug with Communication Relay and Related Method," published as U.S. Patent Application Publication No. 2016/0044447 A1 on Feb. 11, 2016, which claims priority to U.S. Provisional Application No. 61/999,914, filed Aug. 11, 2014; (ii) U.S. patent application Ser. No. 14/988,590, filed Jan. 5, 2016, entitled "IOT Communication Bridging Power Switch," published as U.S. Patent Application Publication No. 2016/0209899 A1 on Jul. 21, 2016, which claims priority to U.S. Provisional Application No. 62/100,000, filed Jan. 5, 2015; and (iii) U.S. patent application Ser. No. 15/254,445, filed Sep. 1, 2016, entitled "System and Method for Displaying Device Specific Information for a Smart Device," which claims the benefit of U.S. Provisional Application No. 62/377,824, filed Aug. 22, 2016, entitled "System and Method for Displaying Device Specific Information for a Smart Device," and claims the benefit of U.S. Provisional Application No. 62/212,842, filed Sep. 1, 2015, entitled "System and Method for Displaying Device Specific Information for In-Wall Smart Device".

Figure 4:
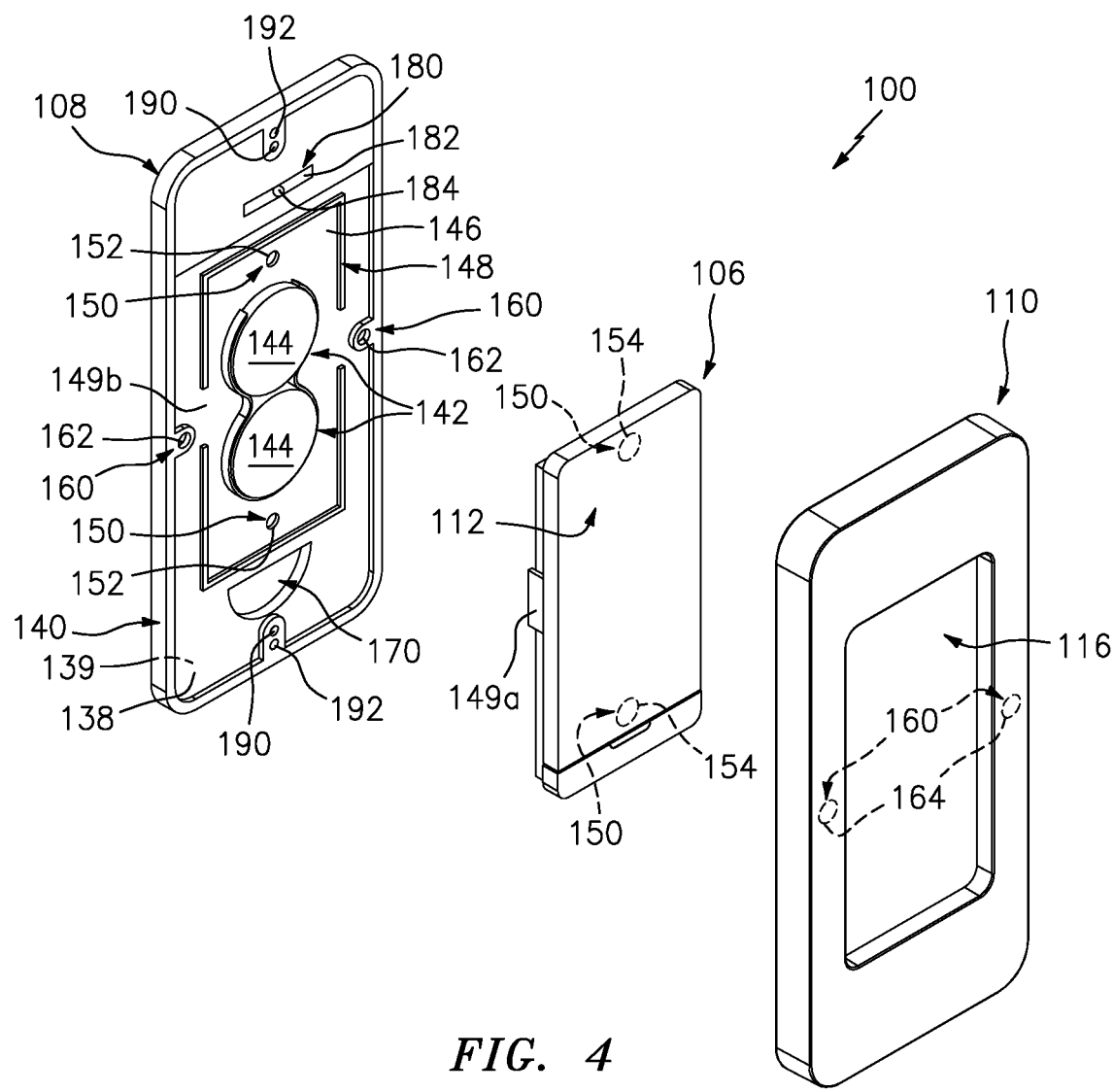
FIG. 4 is front perspective view of a smart device assembly of the system of FIG. 1, in a partly disassembled state.
Figure 5:
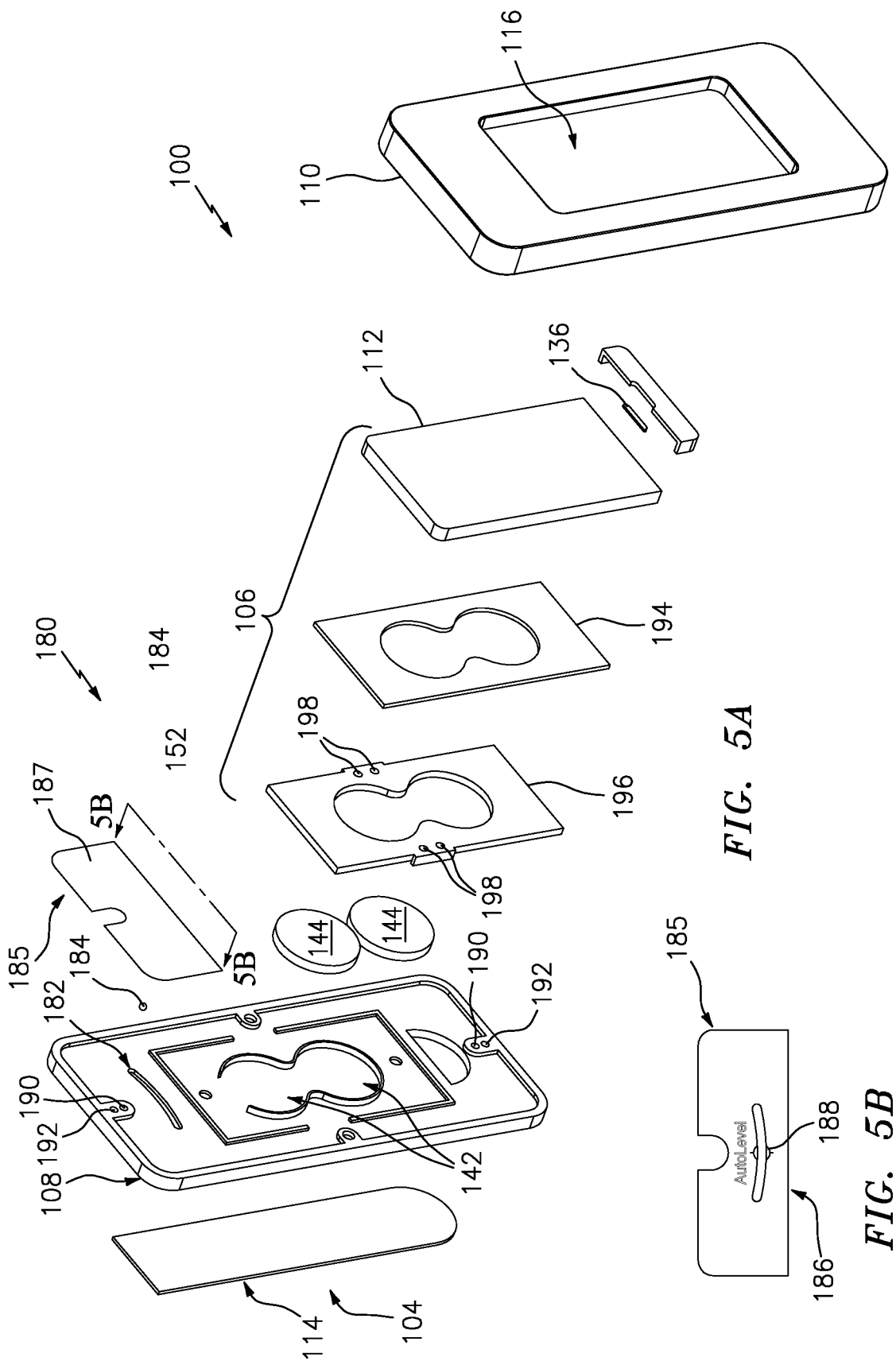
FIG. 5A is an exploded view of the system of FIG. 1.
FIG. 5B is a front view of an indicator that is part of the system of FIG. 1.

FIGS. 4 and 5A show further details of the system 100. In particular, FIG. 4 shows a front perspective view of the smart device assembly 102 in a partly disassembled state. FIG. 5A shows an exploded view of the system 100.

Referring to FIGS. 4 and 5A, in at least some embodiments, the mount 108 may have a front surface 138, a rear surface 139 and side surfaces, e.g., side surface 140. The mount 108 may define one or more seats 142 to receive and/or support one or more batteries 144, which supply power to the smart device 106 via one or more electrical circuits (not shown). The seat(s) 142 may have any suitable configuration to receive and/or support a battery or batteries used in the system 100. In some embodiments, each seat 142 may comprise a battery holder, into which a respective battery may snap in or otherwise be releasably retained. The batteries 144 may comprise any type(s) of batteries and may be rechargeable or non-rechargeable. In some embodiments, each battery 144 may comprise a coin-type battery (e.g., CR2032).

In at least some embodiments, the mount 108 may define a seat 146 to receive and/or support the smart device 106. The seat 146 may have any suitable configuration to receive and/or support the smart device 106. In some embodiments, the seat 146 may comprise a guide 148 to properly position or locate the smart device 106 in the seat 146 and/or relative to the mount 108. In some embodiments, the mount 108 and/or smart device 106 may each define keying features 149a, 149b that are configured to ensure that the smart device 106 is seated in the mount 108 in a proper orientation. In some embodiments, the keying features 149a, 149b define a complementary engaging structure that prevents the smart device 106 from seating in the seat defined by the mount 108 if the complementary structure is not aligned. In some embodiments, the feature 149b on the mount 108 is a slot or other recess in the guide 148 and the feature 149a on the smart device 106 is a projection that is received in the slot or other recess if the smart device 106 is properly oriented with respect to the mount 108. If not so oriented, the keying features 149a, 149b keep the smart device 106 from seating in the mount 108. It should be understood that in other embodiments, keying feature 149a is a slot or recess and feature 149b is a projection.

In at least some embodiments, the mount 108 and/or smart device 106 may define a catch 150 to releasably retain the smart device 106 to the mount 108. In some embodiments, the catch 150 may be defined by one or more components on the mount 108 and one or more components on the smart device 106 that are positioned and/or otherwise configured to engage with the one or more components on the mount 108 to releasably retain the smart device 106 thereto. Thus, in accordance with at least some embodiments, there is no need for a separate (stand-alone) fastener, e.g., a screw, to releasably retain the smart device 106 to the mount 108. In some embodiments, the one or more components on the smart device 106 releasably mate with and/or otherwise complement the one or more components on the mount 108. In some embodiments, the components may comprise magnetic and/or ferromagnetic components. Thus, in some embodiments, the catch 150 may be defined by one or more magnetic and/or ferromagnetic components on the mount 108 and one or more complementary configured ferromagnetic and/or magnetic components on the smart device 106. In some of such embodiments, the catch 150 may be defined by two magnets (not shown) which may be disposed in seats 152 on the mount 108 and two steel (or magnetic) components (not shown) which may be disposed in seats 154 on the smart device 108. In some embodiments, each magnet and steel component may have a cylindrical shape. In some embodiments, each magnet and steel component may have a height of ⅛ inch and a diameter of 0.62 inches. In some other embodiments, the components may comprise complementary configured male and female components. Thus, in some embodiments, the catch 150 may be defined by one or more male and/or female components on the mount 108 and one or more complementary configured female and/or male components on the smart device 106 that engage with the one or more components on the mount 108 to releasably retain the smart device 106 thereto. In some embodiments, the complementary configured components may define a snap fit and/or a friction fit.

In at least some embodiments, the catch may be readily disengaged, without tools, to allow the smart device to be detached from the mount and thereby facilitate access to the batteries that may provide power thereto. Alternatively, the smart device 106 may be attached to the mount 108 by screws and/or any other means. Thus, in some other embodiments, the mount 108 may define one or more openings configured to receive one or more screws or other type(s) of fastener(s) to fasten the smart device 106 to the mount 108.

In accordance with at least some embodiments, the mount 108 and/or cover 110 may define a catch 160 to releasably retain the cover 110 to the mount 108. In some embodiments, the catch 160 may be defined by one or more components on the mount 108 and one or more components on the cover 110 that are positioned and/or otherwise configured to engage with the one or more components on the mount 108 to releasably retain the cover 110 thereto. Thus, in accordance with at least some embodiments, there is no need for a separate (stand-alone) fastener, e.g., a screw, to releasably retain the cover 110 to the mount 108. In some embodiments, the one or more components on the smart device 106 may releasably mate with and/or otherwise complement the one or more components on the mount 108. In some such embodiments, the components may comprise magnetic and/or ferromagnetic components. Thus, in some embodiments, the catch 160 may be defined by one or more magnetic and/or ferromagnetic components on the mount 108 and one or more complementary configured ferromagnetic and/or magnetic components on the cover 110. In some such embodiments, the catch 160 may be defined by two magnets (not shown) which may be disposed in seats 162 on the mount 108 and two steel (or magnetic) components (not shown) which may be disposed in seats 164 on the cover 110. In some embodiments, each magnet and steel component may have a cylindrical shape. In some embodiments, each magnet and steel component may have a height of ⅛ inch and a diameter of 0.62 inches. In some other embodiments, the components may comprise complementary configured male and female components. Thus, in some embodiments, the catch 160 may be defined by one or more male and/or female components on the mount 108 and one or more complementary configured female and/or male components on the cover 110 that engage with the one or more components on the mount 108 to releasably retain the cover 110 thereto. In some embodiments, the complementary configured components may define a snap fit and/or a friction fit. In at least some embodiments, the catch may be readily disengaged, without tools, to allow the cover to be detached from the mount and thereby facilitate access to the smart device and/or the batteries that may provide power thereto. Alternatively, the smart device 106 may be attached to the mount 108 by screws and/or any other means. Thus, in some other embodiments, the mount 108 may define one or more openings configured to receive one or more screws or other type(s) of fastener(s) to fasten the smart device 106 and/or cover 110 to the mount 108.

As described above, use of the tab 132 may require that the tab be pulled in a direction that results in application of at least shear force to the adhesive fastener 114 to thereby cause or otherwise facilitate release of the adhesive fastener 114 from the wall and/or other structure. In at least some embodiments, the mount 108 is configured to facilitate one or more aspects of the above. To that effect, in some embodiments, the mount 108 defines an opening 170 that is positioned and/or otherwise configured to allow a user to access and pull the tab 132 (so long as the cover 110 is detached from the mount 108 and/or otherwise out of the way). In some embodiments, this is accomplished by at least a portion of the opening 170 being disposed aligned with at least a portion of the tab 132 to facilitate access to the tab 132 by a user. In at least some embodiments, the opening is large enough, or otherwise exposes a sufficient portion of the tab, for the user to grip and pull the tab. In some embodiments, at least a portion of the tab 132 and at least a portion of the opening 170 may be disposed aligned with the longitudinal axis 134. In some embodiments, the tab 132 may extend through the opening 170 and rest in front of the mount 108 before the tab 132 is gripped and/or pulled by a user.

In some embodiments, it may be desirable to minimize the depth of the mount 108 (or at least a portion thereof), in order to not interfere with the tab being pulled in a direction that results in application of at sufficient shear force to the adhesive fastener 114 to thereby cause or otherwise facilitate release of the adhesive fastener 114 from the wall and/or other structure (the phrase "depth of the mount 108 (or at least a portion thereof)" refers to the extent that the mount 108 (or the at least a portion thereof) extends from the wall and/or other structure to which it is attached). Due to the depth of the mount, when a user pulls the tab 132, i.e., on the front side of the opening 170, there will be a force component that is normal to the shear direction because the user will be gripping/pulling the tab in a plane that is displaced from the nominal plane of the tab 132, e.g., the plane in which the desired shear direction is located. This is because the thickness or depth of the mount 108 prevents the user from gripping and pulling the tab 132 in the desired plane, e.g., aligned with the desired shear direction. This displacement results in a decrease in force in the shear direction. The thicker the depth of the mount 108, the greater the displacement, and the greater the decrease in force in the shear direction.

In accordance with at least some embodiments, the mount 108 may include a level indicator or level 180. The level 180 may be configured to provide an indication as the angular position or orientation of the mount 108 and/or one or more other portions of the smart device assembly 102 relative to parallel and/or plumb to the force of gravity. The level 180 may have any configuration. In some embodiments, the level 180 may comprise a ball type level or a bubble type level. In accordance with at least some embodiments, the level 180 has at least one portion that moves relative to another portion of the level as the orientation of the level is moved by a user to indicate the angular position or orientation of one or more portion of the smart device assembly relative to parallel and/or plumb to the force of gravity. A ball type level may include a track 182 and a ball 184 disposed in the track 182. The track 182 may have an arcuate shape, which may be defined in part by a radius, and/or any other suitable shape. The ball 184 may comprise a ball bearing and/or any other suitable configuration. In some embodiments, the ball 184 may have a diameter of 2 millimeters and/or about 2 millimeters. The level 180 may further include a retainer 185 (to keep the ball on the track 180) and an indicator 186 showing where the ball 184 will move to and/or otherwise come to rest if the mount 108 and/or one or more other portions of the smart device assembly 102 is parallel and/or plumb to the force of gravity. The retainer 185 and indicator 186 may have any suitable configurations. In some embodiments, the retainer 185 may be integral to the mount 108. In some other embodiments, the retainer 185 may be separate from the mount 108 and attached to the mount 108 at a position that allows the retainer 185 to retain the ball 182 on the track 180. In some embodiments, the retainer 185 may comprise a clear or otherwise transparent material 187 with an adhesive backing on at least a portion thereof (such as a clear acrylic sticker) to facilitate attachment to the mount 108. In some embodiments, the indicator 186 may comprise a circle 188 and/or a sight with a center disposed at a position where a center of the ball 184 will move to and/or otherwise come to rest if the mount 108 and/or one or more other portions of the system 100 is parallel and/or plumb to the force of gravity. In some embodiments, the indicator 186 may be printed on or otherwise disposed on the retainer 185. In accordance with at least some embodiments, the above described ball type level may function so long as the track 182 is not oriented parallel to the surface of the earth.

In at least some embodiments, the level reduces the difficulty encountered by a user when trying to mount the smart device assembly on or against a wall rather than in an electrical box mounted in a wall. In at least some embodiments, the benefit may be multiplied many times over and may become a matter of great convenience to a user due to the fact that the smart device assembly is portable, and consequently, a single smart device may be mounted, detached and re-mounted multiple times over the course of its life.

In at least some embodiments, mount 108 may be configured to be optionally installed, in whole or in part, in an electrical box mounted in a wall, which may be a conventional wall mounted electrical box or any other type of wall mounted electrical box, or an opening or receptacle in the wall. To that effect, in at least some embodiments, the mount 108 may define one or more openings 190 that are configured to receive one or more screws (not shown) or other type(s) of fastener(s) configured to be fastened to, and thereby retain the smart switch to, a wall mounted electrical box or other receptacle mounted in the wall. The mount 108 may further define one or more openings 192 configured to receive one or more screws or other type(s) of fastener(s) to fasten a conventional face or cover plate (not shown) to the mount 108. Thus, the cover 110 may comprise a conventional cover plate or any other type of cover.

In at least some embodiments, the smart device 106 may include a printed circuit board 194 having a plurality of components disposed thereon (which are not shown but may include a smart switch including a microprocessor, a wireless communication interface including a wireless transmitter, receiver and an antenna), which may be disposed between the manually engageable actuator 112 and a support 196. In some embodiments, four screws 198 attach the support 196 to the actuator. However, the smart device 106 is not limited to the configuration above. Rather, the smart device 106 may have any configuration. In at least some embodiments, the smart device 106 may have any features and/or may have any methods of operation that are the same as or similar to one or more features and/or one or more methods of operation in one or more embodiments of one or more smart devices disclosed in any of the co-pending patent applications disclosed above, which as stated above, are expressly incorporated by reference in their entirety as part of the present disclosure.

In at least some embodiments, it may be desirable for the adhesive fastener 114 to be configured to remain releasably attached to a wall and/or other structure throughout all expected usage scenarios of a smart device until such time as a user desires to release the adhesive fastener 114 from the wall and/or other structure. In at least some embodiments, the ability to achieve the above may be enhanced by ensuring that the adhesive fastener 114 has dimensions that equal or exceed certain dimensions relative to the mount 108 and/or the smart device assembly 102 as a whole.

In some embodiments, the mount may have a length of about 4.2 inches and a width of about 1.88 inches and the adhesive fastener 114 may have a length of about 3.5 inches and a width of about 0.75 inches. The inventors have determined that an adhesive fastener of those dimensions, when used with a mount of the specified dimensions, provides adequate retention of the mount (and thus the smart device) to a wall or other surface, while permitting removal therefrom as discussed herein. It should be understood by those of ordinary skill in the art, however, that fasteners of other dimensions may be utilized with mounts of the same or different sizes.

In at least some embodiments, the system 100 may be configured such that in a mounted and assembled state, the system 100 may have an appearance that, from the front, is similar to and/or otherwise corresponds with that of other smart devices (and/or conventional non-smart switches) mounted in nearby walls (and/or other structures) and/or within a line of sight, despite the fact that such other smart devices may have significantly different overall configuration(s) compared to the system 100 because they are mounted in walls rather than on a wall and/or other structure.

As stated above, in at least some embodiments, the smart device assembly 102 may be used to remotely control one or more other smart devices.

Figure 6:
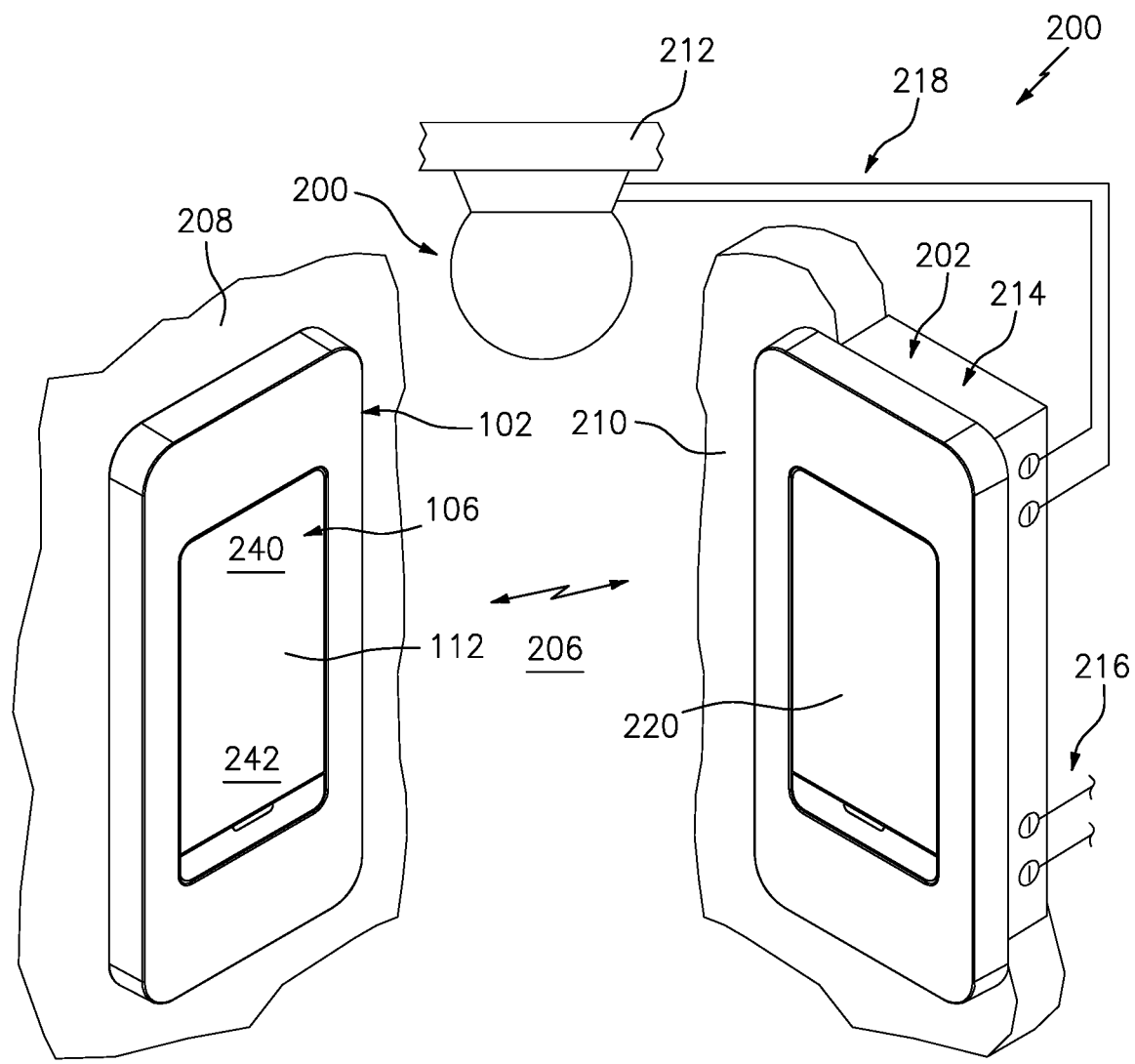
FIG. 6 is a schematic view of an embodiment of a control system that includes the system of FIG. 1.

FIG. 6 is a system 200 in which the smart device assembly 102 may be used to remotely control one or more other smart devices, in accordance with some embodiments.

Referring to FIG. 6, in accordance with some embodiments, the system 200 includes the smart device assembly 102, a smart device assembly 202 and a device 204 (e.g., a light), which may be disposed in a room 206. The smart device 102 may be mounted on a first wall 208. The smart device assembly 202 may be mounted on/in a second wall 210. The device 204 may be mounted on/in a third wall 212 (which may be a ceiling).

It should be understood, though, that the smart device assembly 202 need not be a device (e.g., a switch) that controls a further device. The smart device assembly 202 may be any smart device adapted to receive signals or data from smart device 106. In some embodiments, the device 204 may be a smart device, and the smart device 106 may communicate with and/or control the device 204 by communicating directly with the device 204.

The smart device assembly 202 includes a smart switch 214 that receives electrical power via power lines 216 and supplies electrical power to the device 204 via power lines 218. A manually engageable actuator 220 allows a user to manually change an on/off state of the smart switch 214 and/or control another operation of the smart switch 214.

The manually engageable actuator 112 of the smart device 106 allows a user to remotely change an on/off state of the smart switch 214 and/or control another operation of the smart switch 214.

Thus, the configuration in the system 200 is a type of 3-way configuration.

For example, in some embodiments, if the smart switch 214 is in an off state, tapping on a first side 240 of the manually engageable actuator 112 may cause the smart switch 214 to change to the on state. If, however, the smart switch 214 is already in the on state, tapping on the first side 240 of the manually engageable actuator 112 may have no effect. If instead of tapping, the first side 240 is pressed for a somewhat longer duration, this may cause the smart switch 214 to increase the brightness of the light, unless the brightness is already at maximum.

Likewise, if the smart switch 214 is in an on state, tapping on a second side 242 of the manually engageable actuator 112 may cause the smart switch 214 to change to the off state. If, however, the smart switch 214 is already in the off state, tapping on the second side 242 of the manually engageable actuator 112 may have no effect. If instead of tapping, the second side 242 is pressed for a somewhat longer duration, this may cause the smart switch to decrease the brightness (i.e., dimming), unless the brightness of the light is already at minimum.

Notably, if the smart device assembly 202 was part of a 3-way configuration prior to introduction of the smart switch assembly 102, such 3-way configuration becomes a 4-way configuration after introduction of the smart switch assembly 102. If the smart device assembly 202 was part of a 4-way configuration prior to introduction of the smart switch assembly 102, such 4-way configuration becomes a 5-way configuration after introduction of the smart switch assembly 102. And so on.

In the illustrated embodiment, the manually engageable actuator 112 has a surface or panel that is pivotally movable from a centered, non-actuated position to a first position, and from the centered, non-actuated position to a second position. However, the manually engageable actuator 112 may have any form and/or configuration. In some embodiments, a manually engageable actuator may include on/off toggle (including single pole and double pole), paddle or rocker switches (including single pole and double pole), dimmer switches (including single pole and double pole), touch sensitive surface and/or any combination thereof. In some embodiments, the engageable actuator may be tapped for on/off and/or pressed for a longer duration for less dimming/more dimming. In some embodiments, tapping different locations on the manually engageable actuator may cause different results as programmed in the smart device. It should be understood by those of ordinary skill in the art that the smart device may be programmed, in a manner that should be understood by those of ordinary skill in the art, so that the manually engageable actuator will effect any desired function of the smart device.

In at least some embodiments, the smart device 106 may communicate with and/or remotely control the smart switch 214 of the smart device assembly 202 using a Bluetooth Low Energy communication protocol and/or one or more other low energy protocol. The smart device 106 may transmit signals in the form of commands using a protocol or language recognized or understood by the smart device assembly 202, in response to which the smart device assembly 202 responds or acts in accordance with the commands. In some embodiments, the smart device assembly 202 transmits signals, which may be in the form of data, received by the smart device 106. The smart device 106 may utilize the data to control or adjust the functioning of the smart device assembly 202 via further signals or commands sent to the smart device assembly 202 by the smart device 106. In other embodiments, the smart device 106 may transmit the data or signals received from the smart device assembly 202 to a remote device, such as through a Bluetooth, WiFi or other transmissions, either directly or through a communication network, e.g., a WiFi network.

However, communication and/or remote control need not be limited to the above. In at least some embodiments, the smart device 106 may communicate with and/or remotely control the one or more other smart devices in a manner that is the same as and/or similar to any of the manners disclosed in any of the co-pending patent applications disclosed above, which as stated above, are expressly incorporated by reference in their entirety as part of the present disclosure.

In some embodiments, the smart device assembly 202 may be a part of an appliance and/or other type of system. In some embodiments, the appliance and/or other type of system may be, without limiting, an alert or alarm system, stereo, microwave oven, machinery, a refrigerator, freezer, range, induction stove, oven, fan, computer, television, air conditioner, humidifier, washing machine, dryer, dishwasher, lighting device, lamp, coffee machine, or food processor.

Figure 7:
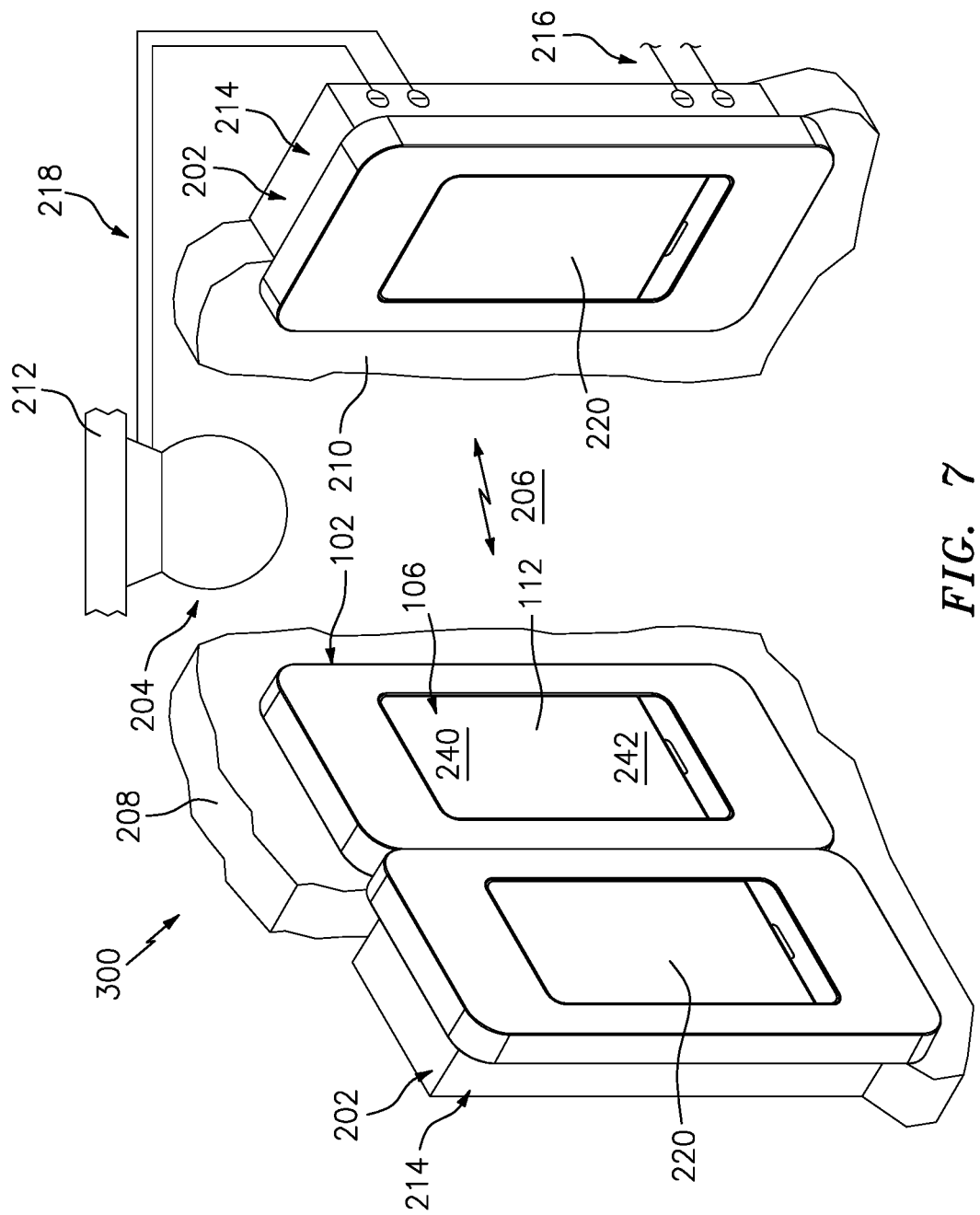
FIG. 7 is a schematic view of another embodiment of a control system that includes the system of FIG. 1.

FIG. 7 is a schematic view of another system 300 in which the smart device assembly 102 may be used to remotely control one or more other smart devices, in accordance with some embodiments. The system 300 may be similar to the system 200 described above in association with FIG. 6, except that the system 300 includes an additional smart device assembly 202 (or any other type of switch assembly, e.g., a conventional non-smart switch) that is mounted in an electrical box that is mounted in the wall 208 and adjacent to the smart device assembly 102. In contrast thereto, in accordance with at least some embodiments, with the possible exception of fasteners (e.g., nails, bolts, screws), no part of the smart device assembly 102 extends into the wall (i.e., beyond the surface of the wall).

In some embodiments, the switch assembly that is adjacent to the smart device assembly 102 may control a device other than the device 204 (e.g., a lamp (not shown) on a table across the room, an air conditioner, music system, motorized window blind, etc.).

Figure 8:
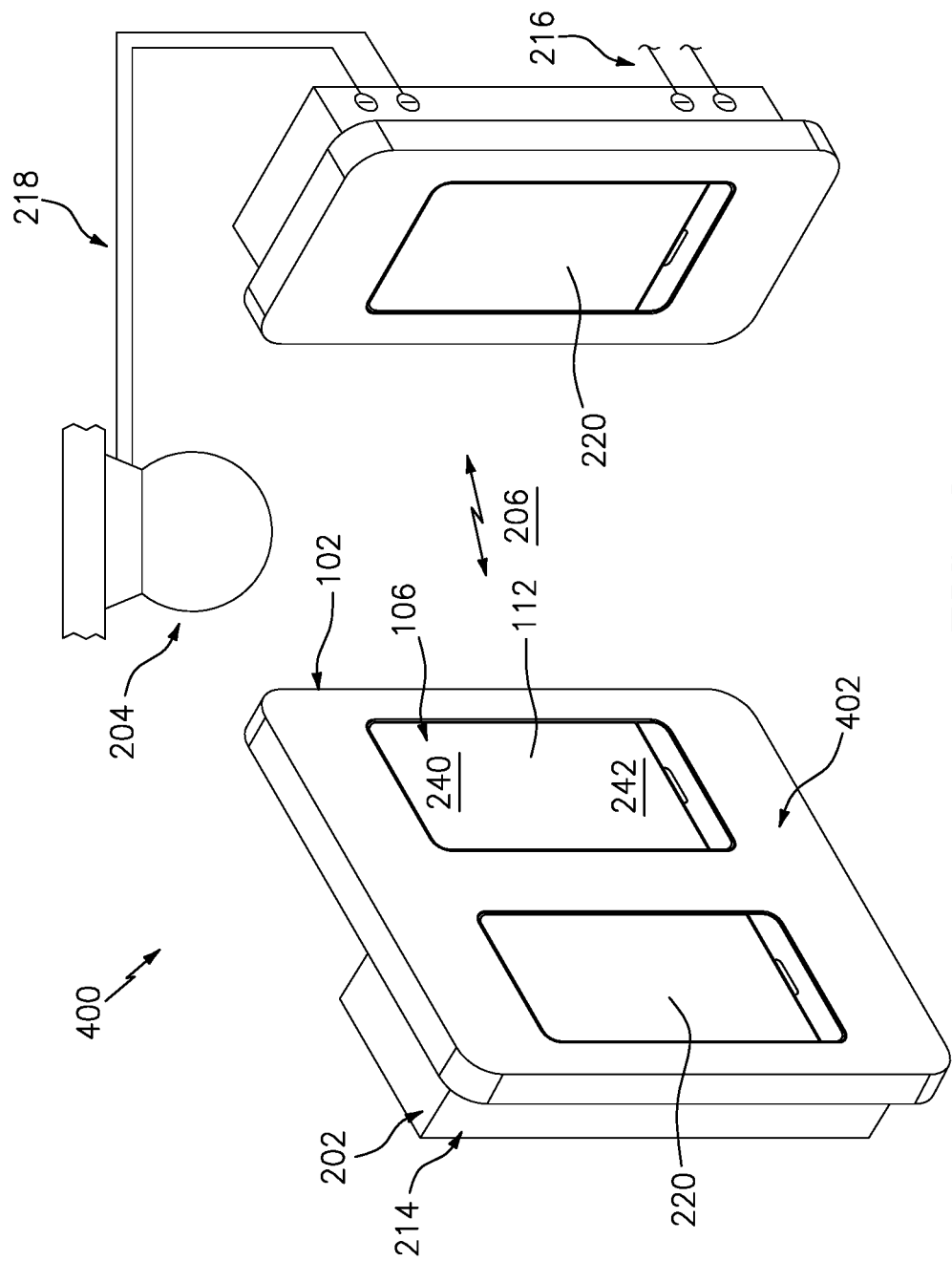
FIG. 8 is a schematic view of a further embodiment of a control system that includes the system of FIG. 1, in accordance with some embodiments.

FIG. 8 is a schematic view of another system 400 in which the smart device assembly 102 may be used to remotely control one or more other smart devices, in accordance with some embodiments. The system 400 may be similar to the system 300 described above in association with FIG. 7, except that in the system 400, the smart device assembly 102 and a smart device assembly 202 share a cover 402.

Thus, in at least some embodiments, the smart device assembly 102 may be disposed adjacent to a switch assembly (smart or not smart) mounted in an electrical box mounted in a wall with a shared cover, e.g., cover 402. In some embodiments, the switch assembly that is adjacent to the smart device assembly may control a device other than the device 204 (e.g., a lamp (not shown) on a table across the room).

In some embodiments, the dimensions (and rest of the configuration) of the smart device assembly 102 are selected so that the smart device assembly 102 can be placed a distance from adjacent switch 202 and the combined span of the switches is such that a standard (known) cover with multiple openings can be used to cover both switches.

In some embodiments, the cover 402 may be the same as and/or similar to a conventional face plate with two openings for two switches such that the arrangement has an appearance that is the same as or similar to that of two conventional switches mounted in an electrical box mounted in the wall with a shared double face plate.

Thus, the smart device assembly 102 may be used to convert a row of two or more switches with a shared cover into a row of three or more switches with a shared cover.

In at least some embodiments, the smart device assembly 102 may be disposed adjacent to more than one switch (e.g., 2, 3, 4 or any other number) that are mounted (e.g., in a row) in one or more electrical boxes that are mounted in a wall and all the switches (including the smart device assembly 102) may share a cover.

Further details of the smart device 106 and interaction between the smart device 106 and the smart switch 214 or other smart device are further described below.

Figure 9:
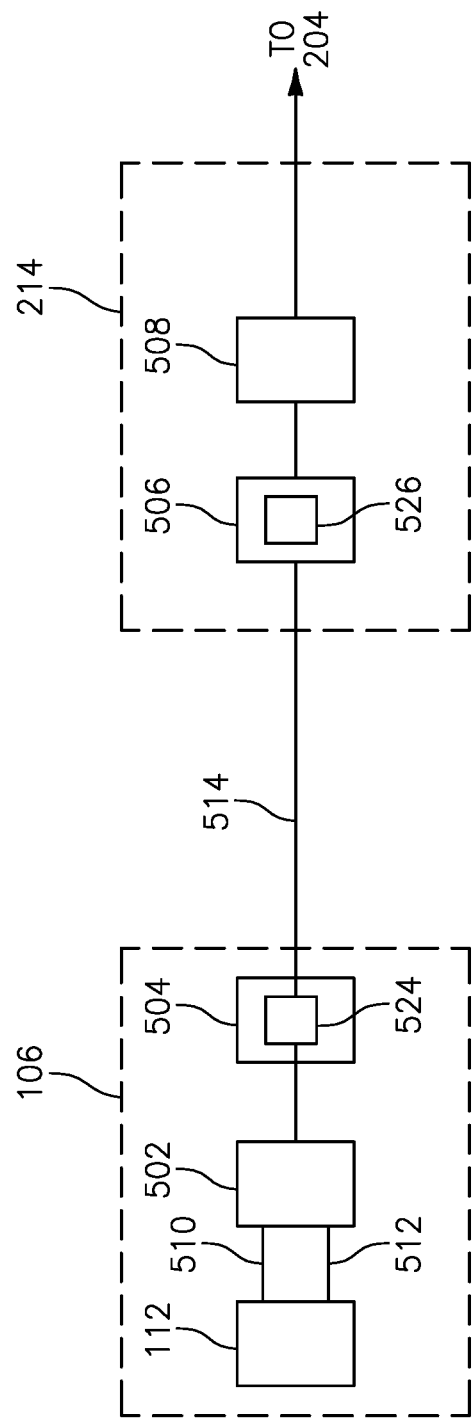
FIG. 9 is a schematic block diagram of a portion of the control systems of FIGS. 6-8, in accordance with some embodiments.

FIG. 9 is a schematic block diagram of a portion of the control systems of FIGS. 6-8, in accordance with some embodiments. Referring to FIG. 9, in accordance with at least some embodiments, the smart device 106 includes the manually engageable actuator 112, a processor 502, and a wireless communication interface 504. The smart switch 214 or other smart device includes a wireless communication interface 506 and a processor 508. The manually engageable actuator 112 is, in the illustrated embodiment, shown as a rocker switch with a surface or panel that is pivotally movable from a centered, non-actuated position to a first position, and from the centered, non-actuated position to a second position. However, as stated above, the manually engageable actuator 112 is not limited to such. In some embodiments, the manually engageable actuator may comprise any form (any type of control system for actuation by a user) that allows a user to input "commands" to control the device 204.

The manually engageable actuator 112 is coupled to the processor 502. For example, if the manually engageable actuator 112 is a rocker switch with a surface or panel that is pivotally movable from a centered, non-actuated position to a first position, and from the centered, non-actuated position to a second position, the processor 502 may have first and second data lines 510, 512 coupled to the manually engageable actuator 112.

The processor 502 is coupled to the wireless communication interface 504, which is coupled to the wireless communication interface 506 of the smart switch 214 through a communication path 514. In the illustrated embodiment, the communication path 514 is a direct wireless communication path. Two protocols that may be used to accomplish direct wireless communication between the smart devices 106, 214 are Bluetooth and Bluetooth low energy (BLE), in embodiments where the smart device 106 and the smart switch 214 are equipped to handle such. In some other embodiments, the smart device 106 and the smart switch 214 may communicate indirectly, for example, via a Wi-Fi network, the Internet and/or combinations thereof. It should be understood by those of ordinary skill in the art, though, that the communication via path 514 may be of any suitable wireless communication protocol or system, either currently known or later developed.

In some embodiments, the smart device 106 and the smart switch 214 must be paired in order to establish the communication path (e.g., receive information from and/or transmit information to one or more devices via a wireless network, e.g., a personal area network, e.g., a Bluetooth or WiFi personal area network). In some embodiments, this is accomplished by entering information specific to the smart device 106 and/or smart switch 214 into an application through a PC, tablet or smartphone. In some embodiments, the device specific information may include pin code, MAC address, serial number, IP address, service set identifier, QR code, barcode, data matrix, etc. In some embodiments, a user may need to enter a password as authentication to enable communication between the smart device 106 and the smart switch 214.

Each wireless communication interface 504, 506 may include a transceiver 524, 526, respectively, each of which may comprise a radio transmitter and an antenna, or any other suitable device for transmitting and receiving radio or wireless signals as should be appreciated by those of ordinary skill in the art. The antenna may consist of a PCB antenna, a chip antenna, an integrated antenna in the radio IC/module, or any other antenna configured for wireless transmission known to those of skill in the art or later become known. The transceiver 524 may communicate wirelessly with the transceiver 526 using any method of wireless communication that is currently known or may later become known, including but not limited to R-F communication, infrared communication, Bluetooth communication, Bluetooth low energy (BLE), cellular, and Wi-Fi communication.

In operation, a user actuates the manually engageable actuator 112 and the processor 502 receives a signal indicative thereof. For example, if the user has tapped on the first side 240 of the manually engageable actuator 112, the processor 502 may receive a signal indicative thereof on the first data line 510. The processor 502 may generate one or more signals in response (at least) thereto and indicative thereof, which are supplied to the wireless communication interface 504 for transmission to the wireless communication interface 506 of the smart switch 214. To this effect, the processor 502 of the smart device 106 may include a computer program, e.g., an application, for generating signals for the wireless communication interface 504 based on signals received on the first and second data lines 510, 512 to transmit to the wireless communication interface 506, via the communication path 514 discussed above, and the processor 508 of the smart switch 214 (or other smart device) performs the appropriate action. To this effect, the processor 508 of the smart switch 214 may include a computer program, e.g., an application, for generating signals for the device 204 to be controlled based on signals received from the smart device 106.

The processor 502 and the processor 508 may be implemented as a distributed architecture or a non-distributed architecture. A distributed architecture may be a completely distributed architecture or a partly distributed-partly non-distributed architecture.

In some embodiments, the processor 502 and/or the processor 508 may each comprise a microprocessor (which includes a CPU) and a software storage device. The storage device may comprise any suitable, computer-readable storage medium such as disk, non-volatile memory, etc., as will be understood by those of ordinary skill in the art (e.g., read-only memory (ROM), erasable programmable ROM (EPROM), electrically-erasable programmable ROM (EEPROM), flash memory, field-programmable gate array (FPGA), etc.). Software embedded on the storage device may be embodied as computer-readable program code and executed by the CPU using any suitable high or low level computing language as would be understood by those of ordinary skill in the art, such as, but not limited to, Python, Java, C, C++, C #, .NET, MATLAB, etc. In some embodiments, each CPU may include any suitable single- or multiple-core microprocessor of any suitable architecture that is capable of implementing and running a control protocol desired for the respective smart device (e.g., Intel processor).

In at least some embodiments, the processor 502 of the smart device 106 is configured to generate and send signals to the smart switch 214, in accordance with software contained in the computer-readable storage medium of the processor 502. The processor 508 of the smart switch 214 is configured to generate and send signals to the device 204, in accordance with software contained in the computer-readable storage medium of its microprocessor, so that the smart switch 214 can receive signals from the smart device 106 and implement to operate the device 204.

In the illustrated embodiment, the smart device 106 receives power from batteries. However, in some embodiments, power for the smart device 106 may come from any source(s).

Although the device 204 is shown as a light, the device 204 may be any type of device, for example, but not limited to an alert or alarm system, stereo, microwave oven, machinery, a refrigerator, freezer, range, induction stove, oven, fan, computer, television, air conditioner, humidifier, washing machine, dryer, dishwasher, lighting device, lamp, coffee machine, or food processor. As discussed above, device 204 may itself be a smart device that wirelessly communicates with smart device 102. Thus, some implementations do not contain a smart switch 214 in the communication or control path between smart device 102 and device 204.

In some embodiments, the smart device 106 is also configured to receive signals, which may be in the form of data, through wireless communication interface 504. The smart device may receive signals from any device capable of sending wireless signals, including, without limitation, device 204 (if it is a smart device) or smart switch 214.

In some such embodiments, the data can comprise firmware or software updates for the smart device 106. For example, smart device 106 can be programmed to transmit information regarding the firmware/software of smart device 106, e.g., version, date of last update, etc., to any device paired or otherwise communicatively connected thereto, e.g., smart device 204. In some embodiments, this transmission takes place when smart device 106 pairs or is otherwise connected with smart device 204, e.g. via Bluetooth or Bluetooth Low Energy. Alternatively, the smart device can transmit the information at programmed times or intervals. In other embodiments, smart device 204 can be programmed to query smart device 106 regarding its firmware. Regardless of how the information is transmitted to the smart device 204, after smart device 204 receives information regarding the firmware/software of smart device 106, smart device 204 can facilitate an update to the firmware/software is available. For example, smart device 204 can send the information to a server, e.g., in cloud, and the server can determine whether an update is available. In other embodiments, the smart device 204 can determine this itself by searching through the cloud or internet for an update. Regardless of how an update is queried/determined, if an update is available, it can be downloaded (e.g. via a Wi-Fi to an internet conn) to the smart device 204, and the smart device 204 can transmit it to smart device 106 (e.g., via Bluetooth or Bluetooth Low Energy). In such embodiments, the smart device 106 is configured, e.g., programmed, to install/run the update.

In other embodiments, the smart device 106 can be similarly updated by pairing/connecting to another wireless-enabled, internet-connectable device, such as a smart phone (not shown). In such embodiments, the smart phone may contain a program or "app" that is adapted to query/receive the relevant information from the smart device 106. In some such embodiments, for example, the update process can be initiated or continued when the smart phone is brought within wireless range of the smart device.

Advantageously, then, the firmware/software for smart device 106 can thus be updated even though it does not have an independent data connection to the internet/cloud. Such situation is common with battery-powered and/or Bluetooth/BLE devices, due to their limited wireless range and/or the power drain of an internet connection. Moreover, an update using, for example, a low-energy communications protocol, such as Bluetooth or Bluetooth Low Energy, permits updating without exhausting battery 144. Thus, the smart device 106 can be updated without connecting the smart device 106 to a separate power source, permitting it to be placed and used in any desired location.

In FIGS. 10-17, another wireless control system is indicated generally by the reference numeral 600. The system 600 is similar in many respects to the system 100 described above with reference to FIGS. 1-5B, and therefore like reference numerals preceded by the numeral "6" instead of the numeral "1" are used to indicate like elements.

As in the embodiment of system 100, system 600 includes a smart device assembly 602 and fastener 604. Smart device assembly 602 generally comprises three parts—smart device 606, mount 608, and cover 610. Furthermore, as shown by a comparison of FIG. 12 to FIG. 1, when cover 610, smart device 606, and mount 608 are all attached to each other, the system 600 has a similar external appearance from a front view as system 100. As with system 100, the system 600 may be configured for use with existing face plates.

Figure 13:
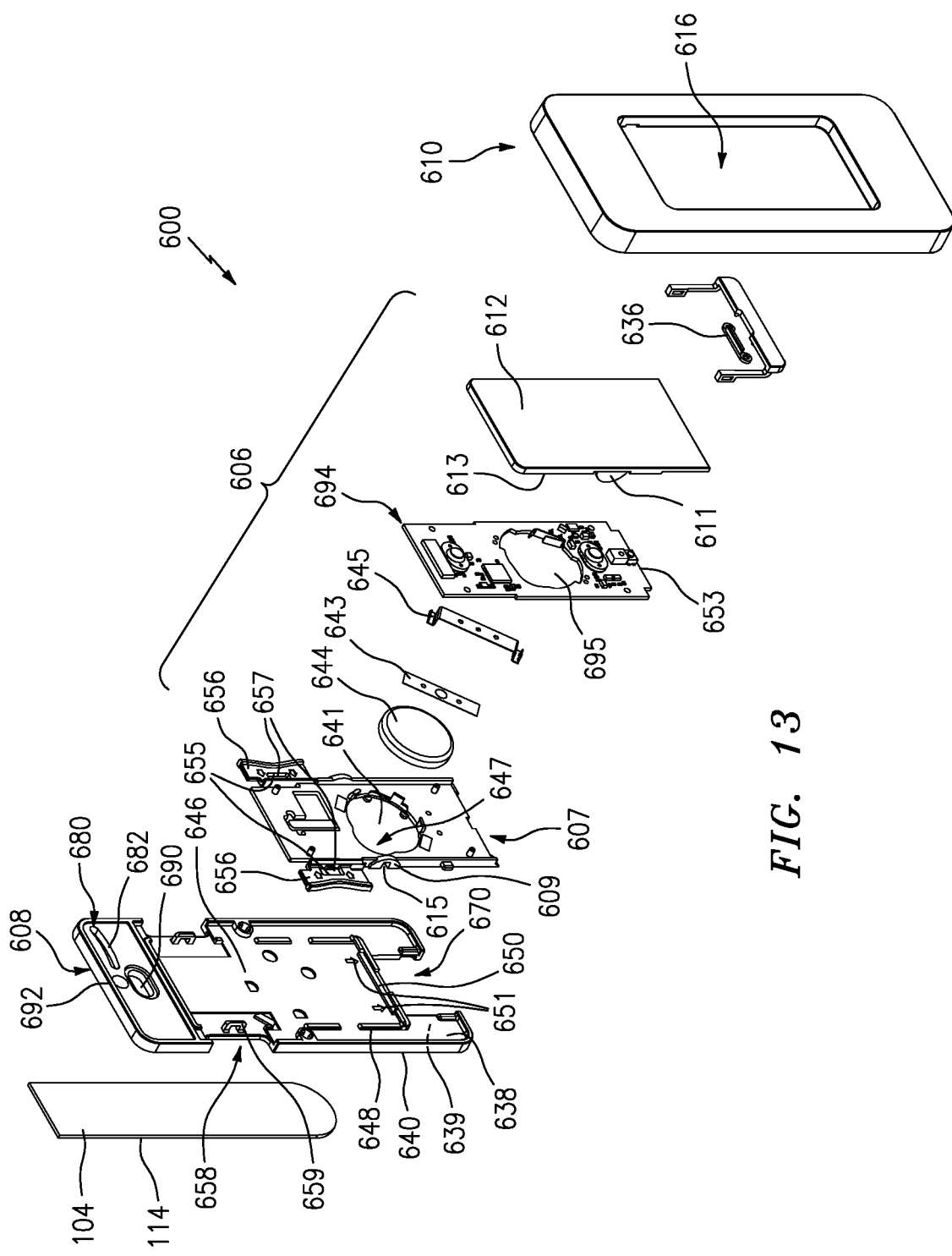
FIG. 13 is an exploded view of the wireless control system of FIG. 10.

Some differences between system 600 and system 100 are as follows. As seen in FIG. 13, for example, smart device 606 comprises backing 607, battery 644, negative battery contact 643, insulator 645, printed circuit board 694, and manually engageable actuator 612.

Referring still to FIG. 13, the battery 644 is seated in hole 641 in backing 607, and it extends into hole 695 in printed circuit board 694. In at least some embodiments, one or more of hole 641, hole 695 and/or insulator 645 is sized/shaped to releasably retain the battery 644 in position, so that it is not retained too loosely (which may disrupt the power supply) or unintentionally dislodges. When a user desires to remove the battery, e.g., to change it, the user can remove the smart device 606 from mount 608, and remove the battery from the back of smart device 606. As can be seen in FIG. 13, hole 641 does not define a circular profile, but rather includes one or more notches 647 around its edges. The notches 647 in this embodiment are configured, e.g. sized, so that a user can insert his or her finger or tool into one of the notches to dislodge battery 644 and thereby remove the battery. Although only one coin-type battery 644 is depicted, one of ordinary skill in the art will recognize that any number of batteries, and any type of battery, can be used in smart device 606.

Backing 607 and actuator 612 are configured to be connected to each other to form opposing surfaces of smart device 606. Backing 607 includes semicircular half-rings 609 extending from lateral edges thereof. The semicircular half-rings 609 each define an opening 615 therein. Actuator 612 includes semicircular half-discs 611 extending from lateral edges 613 thereof. The semicircular half-discs 611 of actuator 612 are configured to be substantially vertically aligned with the half-rings 609 of backing 607 when the actuator 612 and the backing 607 are assembled. The half-discs 611 include projections (not shown) that are configured to fit into the openings 615 of semicircular half-rings 609, and thereby releasably or non-releasably secure the actuator 612 to the backing 607. As can be recognized by one of ordinary skill in the art, other methods of attachment of actuator 612 to backing 607 can be utilized without departing from the scope of the invention.

Still referring to FIG. 13, system 600 features a mechanism for attaching smart device 606 onto mount 608. Printed circuit board 694 defines a protrusion 653 on the bottom end thereof. Protrusion 653 is located to substantially correlate with slot 650 on mount 608 when printed circuit board 694 and mount 608 are assembled. Mount 608 may further include arrows 651, which point to the location and/or direction of insertion of protrusion 653 into slot 650. When protrusion 653 is inserted into slot 650, the bottom end of the printed circuit board is releasably retained to the mount 608 by the slot 650.

Backing 607 also includes tabs 656. Tabs 656 are made of a flexible or resilient material, e.g., a deformable plastic. Tabs 656 define therein apertures 655. Mount 608 further includes openings 658 on opposite sides thereof, and a projection or loop 659 adjacent each opening 658. The apertures 655 are configured to substantially align with loops 659 on mount 608 when the tabs 656 are squeezed and the backing 607 is assembled to the mount 608.

Figure 17:
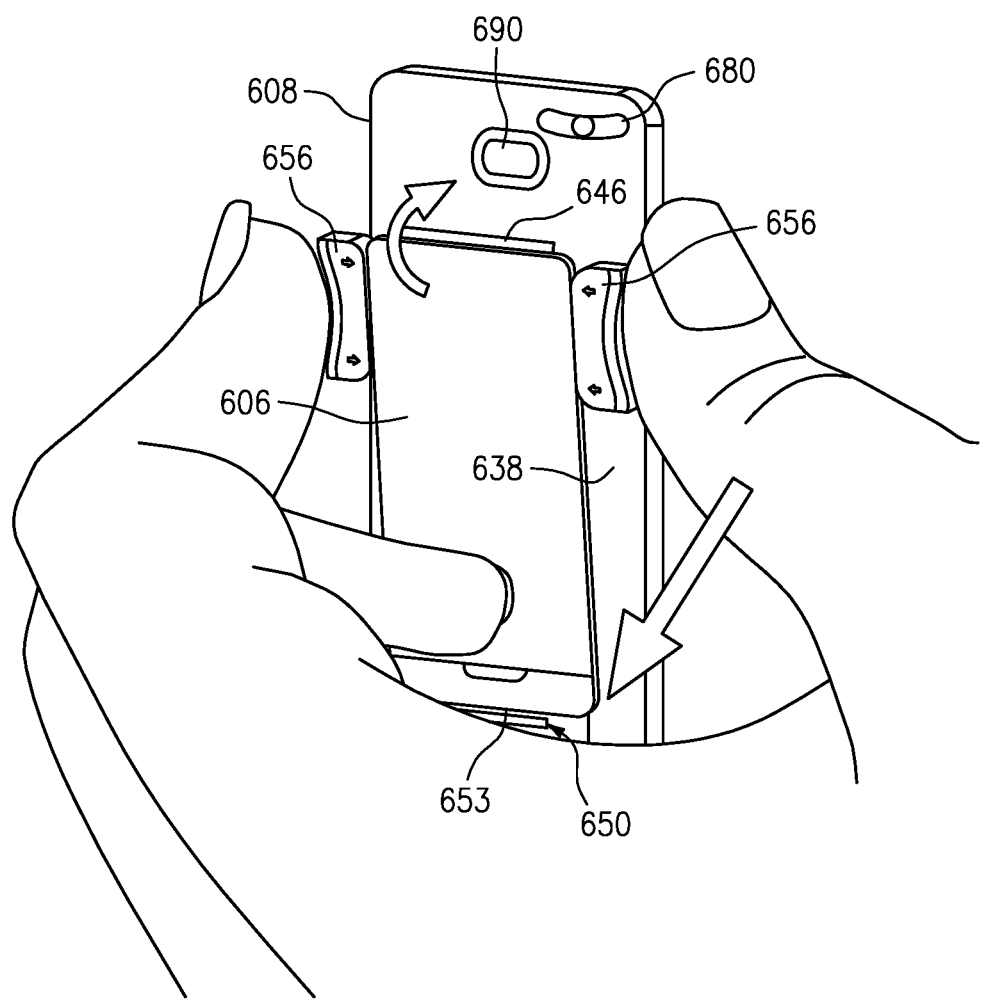
FIG. 17 is a front perspective view of the smart device assembly of FIG. 14, illustrating assembly of parts thereof.

To attach smart device 606 to mount 608, and as seen in the embodiment of FIG. 17, a user first inserts protrusion 653 into slot 650, at the location illustrated by the straight arrow in the figure. When the user inserts protrusion 653 into slot 650, the smart device 606 may be angled relative to mount 608. Then, the user tilts the smart device 606 upward, in the direction of the curved arrow in the figure. The user squeezes tabs 656, so as to align apertures 655 with loops 659. The user then moves the top end of the smart device 606 toward the mount 608, so as to cause apertures 655 to pass around loops 659. The user then releases tabs 656 to secure the device onto the mount. Release of the tabs 656 causes the tabs 656 to undeform back toward their original shape/position. This causes edges of the apertures to come into contact with the loops 659, helping to secure the backing 607 to the mount, e.g. by friction.

The backing 607 may also include projections 657 that, when the tabs 656 undeform after release, rest underneath loops 659 when the smart device 606 is attached to the mount 608, so as to provide an interference between the projections 657 and the loops 659 that reduces the possibility of accidental removal or disengagement of the of the smart device 606 from the mount 608. In some embodiments, the attachment of tabs 656 to the mount 608 produces an audible clicking or snapping sound. The clicking sound may signal to the user that the attachment has been successful.

Figure 12:
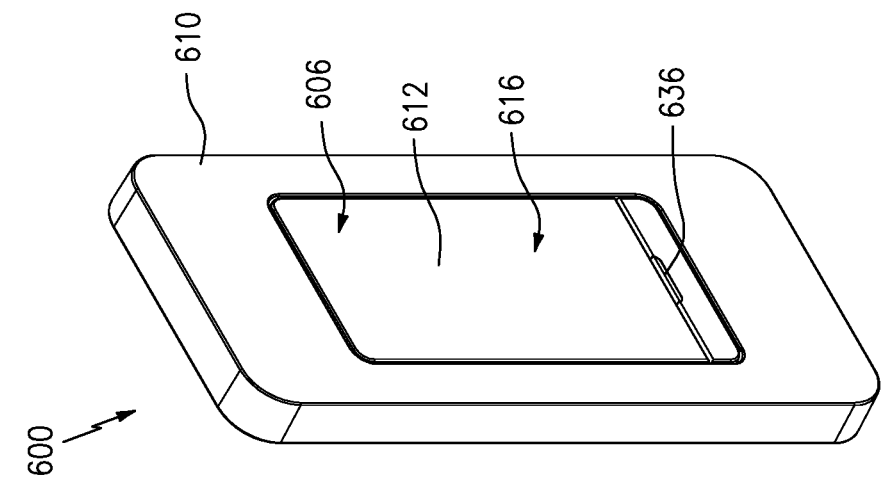
FIG. 12 is a front perspective view of the wireless control system of FIG. 10.
Figure 11:
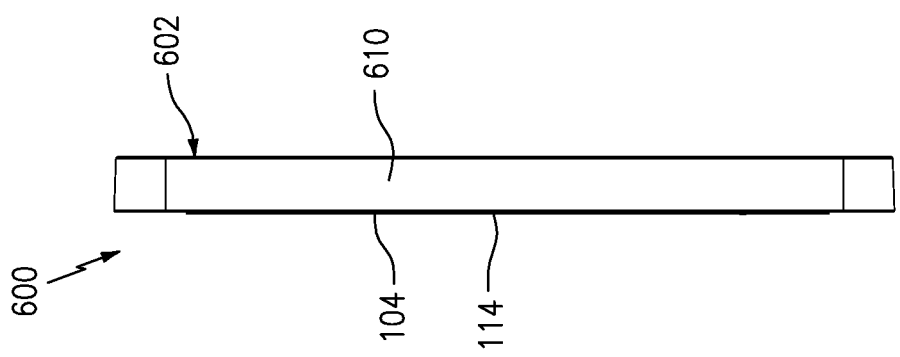
FIG. 11 is a side view of the wireless control system of FIG. 10.
Figure 10:
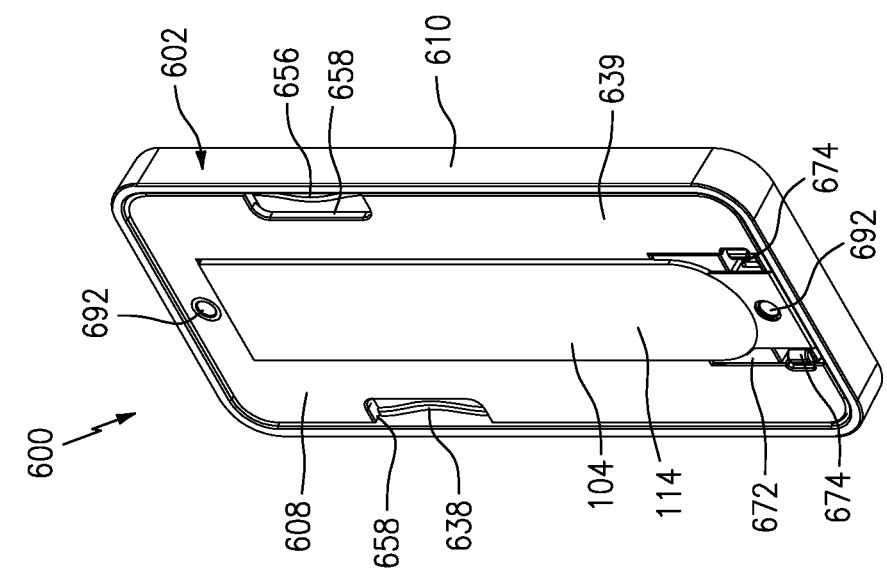
FIG. 10 is a rear perspective view of another embodiment of a wireless control system.
Figure 14:
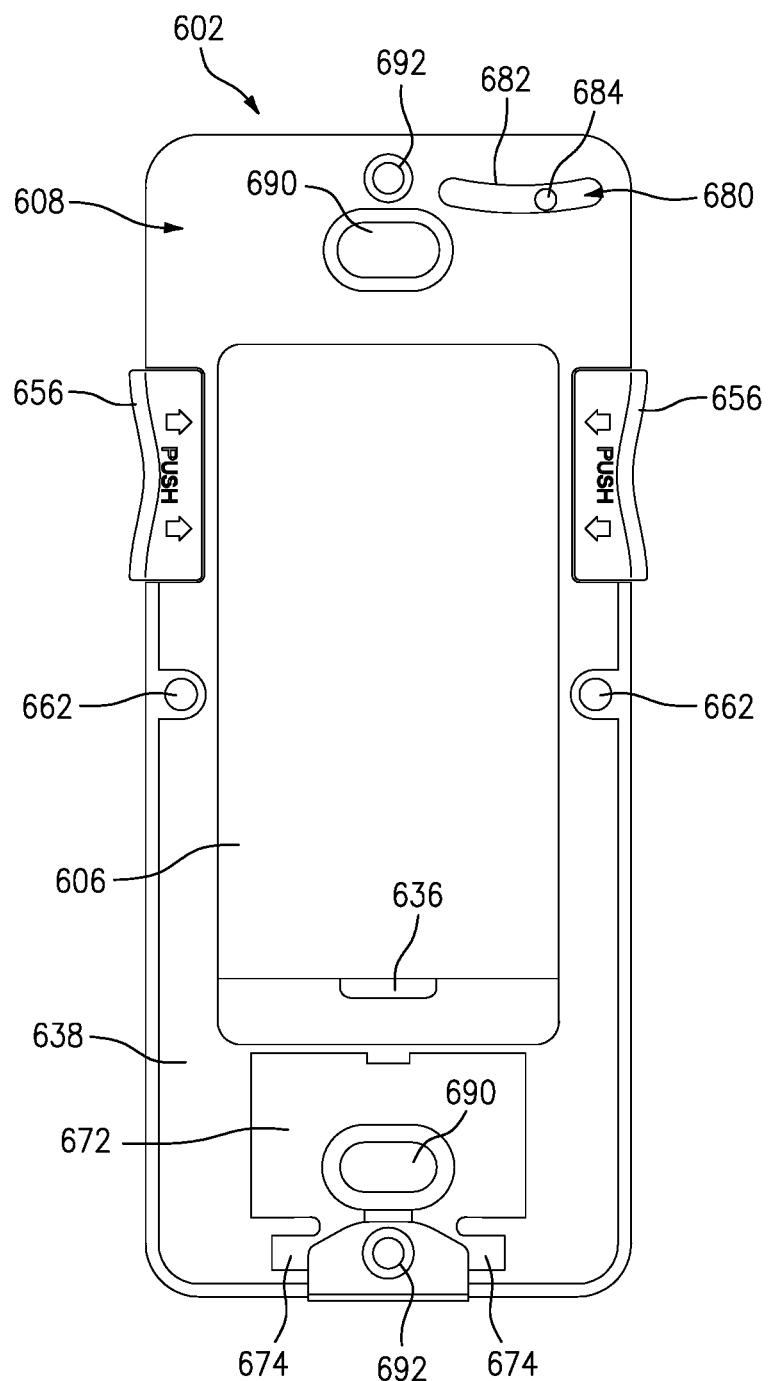
FIG. 14 is a front view of a smart device assembly of the wireless control system of FIG. 10 in a partly disassembled state.
Figure 16:
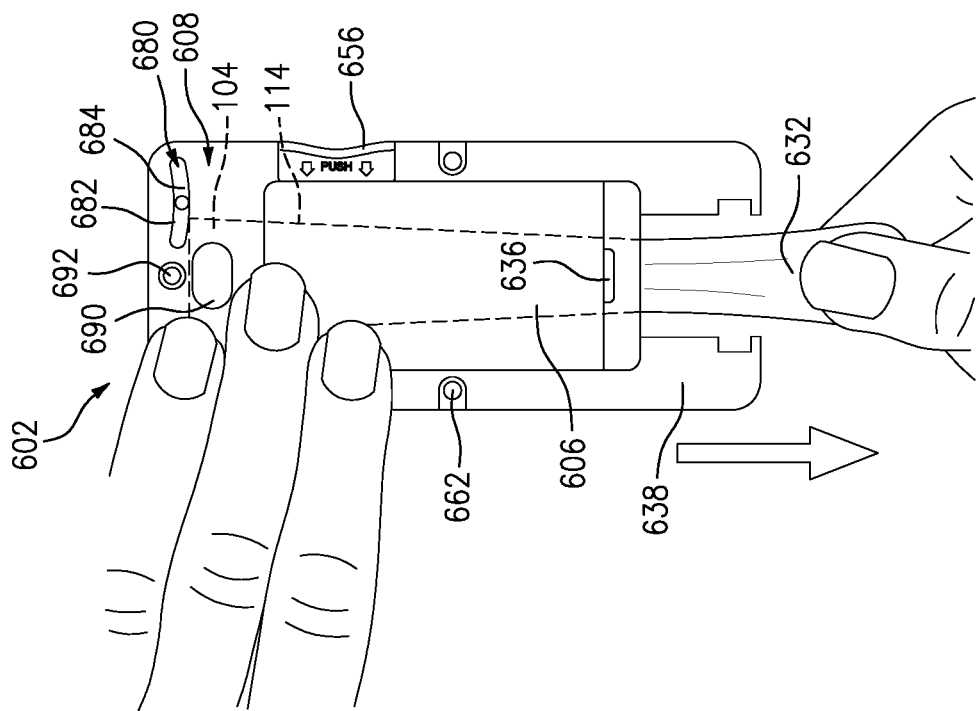
FIG. 16 is a front view of the smart device assembly of FIG. 14, illustrating removal of the smart device assembly from a surface.
Figure 15:
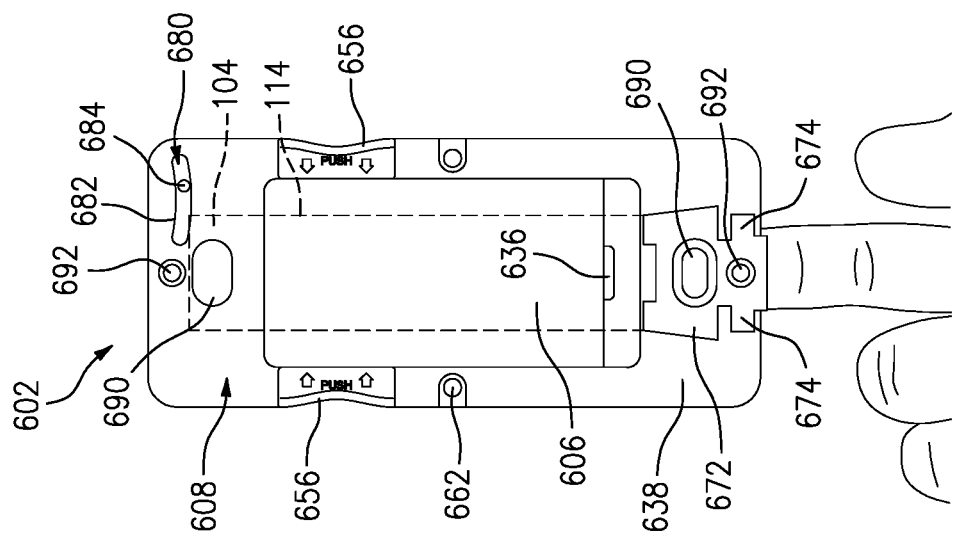
FIG. 15 is a front view of the smart device assembly of FIG. 14, illustrating removal of an access door from the assembly.

As seen in FIGS. 14-16, upon attachment of the smart device 606 to the mount 608, the tabs 656 are located in or over the space in openings 658, such that the lateral extent of the tabs 656 is the substantially same as the lateral extent of surfaces 639, 640 of mount 608. Advantageously, this configuration enables cover 610 to conceal tabs 656, as seen in FIGS. 10-12. Nor do the tabs 656 interfere with the mounting of the cover 610.

One advantage of the attachment mechanism described above is that it can use entirely plastic parts. Thus, it may be less expensive to produce compared to other attachment mechanisms, e.g., attachment mechanisms using magnetic or ferromagnetic components. In addition, the attachment mechanism is ergonomically intuitive and allows for repeated removal and replacement of smart device 606 from mount 608, as needed.

System 600 also includes a removable access door 672 in mount 608, which can aid in the removal of system 600 from a wall or other surface, as will be described below. In the illustrated embodiment, and as seen in FIGS. 10 and 14, access door 672 includes lateral protuberances 674 that are snap-fit or friction-fit into corresponding slots in the mount. However, access door 672 is attachable to mount 608 through any suitable mechanism that should be known to those of skill in the art to achieve the functions described herein.

As shown in FIG. 14, access door 672 includes an opening 690 that is configured to receive therein one or more screws (not shown) or other type(s) of fastener(s) configured to fasten, and thereby retain the smart switch to, a wall mounted electrical box or other receptacle mounted in the wall, or the wall itself. The access door 608 further includes one or more openings 692 configured to receive therein one or more screws or other type(s) of fastener(s) to fasten a conventional face or cover plate (not shown) to the mount 608. Thus, when attached to the mount 608, the access door 672 performs the same functions as the corresponding upper portion of the mount 608 (i.e., the portion with openings 690, 692 formed in front surface 638 of mount 608).

As illustrated, access door 672 is removable from mount 608. As seen in FIGS. 10 and 11, adhesive fastener 614 can be appropriately sized and oriented along the rear surface 639 of mount 608, so that the lowermost portion of mount 608 is not in contact with the adhesive fastener 614. Accordingly, and as shown in FIG. 15, the user can place a finger or tool into the space behind the bottom of access door 672 and dislodge the access door 672 by pulling it forward (away from the wall), to thereby remove the access door 672 from mount 608.

Further referring to FIG. 16, after removal of the access door 672, a lower end of the adhesive fastener is accessible through the opening in the mount 608 created by the removal of the access door 672. The user can separate or remove adhesive fastener 614 from the wall or other structure onto which the smart device assembly 602 has been mounted. To remove the adhesive fastener 614, the user can grasp tab 632, e.g., with the user's fingers, and pull the tab in a manner that results in application of shear force to the adhesive fastener 614 to separate it from the wall or other surface, e.g., downwardly in the embodiment of FIG. 16 as shown by the arrow. This application of shear force may be performed in the manner or a similar manner described above in connection with system 100.

One advantage of the removable access door 672 is that it enables the user to apply shear force to tab 632 but minimize application of any force component that is normal to the shear direction. Because of the removal of the access door 672, it is not necessary for the user to pull the tab 632 around the bottom of mount 608. This is because, as shown in FIG. 16, the bottom of mount 608 is no longer present. Thus, as shown in FIG. 16, the user can position his or her hand directly below the mount, and pull tab 632 using a minimum of force that is normal to the shear direction. In addition, and for the same reason, access door 672 permits the use of an adhesive fastener 614 for removable attachment of mount 608, regardless of the depth of mount 608. A further advantage of removable access door 672 is that it includes holes 690, 692, and thus preserves the ability of mount 608 to be attached to an electrical box or other object using fasteners, and a conventional cover plate can also be attached.

Unless stated otherwise, a wall may have any configuration and/or orientation suitable to a situation. In some embodiments, a wall may be oriented vertically. In some embodiments, a wall may be oriented horizontally (e.g., a ceiling wall).

Unless stated otherwise, the phrase "disposed on" means "disposed directly on, at least in part" and/or "disposed indirectly on." Unless stated otherwise, the term "on" does not necessarily mean "on top of" since relative position (top, bottom, above or below) depends on orientation.

It should be understood that the smart device features disclosed herein can be used in any combination or configuration, and are not limited to the particular combinations or configurations expressly specified or illustrated herein. In some embodiments, one or more of the features disclosed herein may be used without one or more other feature disclosed herein. In some embodiments, each of the features disclosed herein may be used without any one or more of the other features disclosed herein.

Thus, in some embodiments, a system may include: (1) a wireless smart device assembly that includes a smart device, wherein the smart device assembly is mounted against an unopened surface of a wall or other structure with no part of the smart device extending past a surface of the wall or other structure; (2) a fastener that includes adhesive and is coupled to the smart device assembly and releasably attachable to the wall or other structure; (3) a level configured to indicate an angular position or orientation of one or more other portion of the smart device assembly relative to parallel and/or plumb to the force of gravity and (4) a catch defined by the mount and/or cover to releasably attach the cover to the mount. However, in some embodiments, a system need not include each of (1), (2), (3) and (4). Rather, in some embodiments, a system may include (1), (2), (3) and/or (4).

Unless stated otherwise, the phrase "A and/or B" means the following combinations: (i) A but not B, (ii) B but not A, and (iii) A and B. It should be recognized that the meaning of any phrase that includes the term "and/or" can be determined based on the above. For example, the phrase "A, B and/or C" means the following combinations: (i) A but not B and not C, (ii) B but not A and not C, (iii) C but not A and not B, (iv) A and B but not C, (v) A and C but not B, (vi) B and C but not A, and (vii) A and B and C. Further combinations using and/or shall be similarly construed.

Unless stated otherwise, the term "smart device" means an electronic device that is connected to another device or network via a wireless protocol, such as Bluetooth, NFC, WiFi, 3G, LTE, etc.

Unless stated otherwise, the term "smart switch" means a smart device that is, or includes a switch. Unless stated otherwise, the term "switch" means a device for turning on or off, directing an electric current, making or breaking a circuit, or otherwise controlling another device or appliance. Exemplary smart switches include, without limitation, an on//off toggle (including single pole and double pole), paddle or rocker switches (including single pole and double pole), dimmer switches (including single pole and double pole), combined on/off and dimmer switches, combined light switches and fan controls, combined light switches and other appliance controls, and power outlets.

In at least some embodiments, one or more portions of one or more embodiments disclosed herein may be embodied in a method, an apparatus, a system, a computer program product, and/or a non-transitory machine-readable storage medium with instructions stored thereon. In at least some embodiments, a machine comprises a processor.

Unless stated otherwise, a processor may comprise any type of suitable processor. For example, a processor may be programmable or non-programmable, general purpose or special purpose, dedicated or non-dedicated, distributed or non-distributed, shared or not shared, and/or any combination thereof. A processor may include, but is not limited to, hardware, software (e.g., low-level language code, high-level language code, microcode), firmware, and/or any combination thereof. Hardware may include, but is not limited to off-the-shelf integrated circuits, custom integrated circuits and/or any combination thereof. In some embodiments, a processor comprises a microprocessor. Software may include, but is not limited to, instructions that are storable and/or stored on a computer readable medium, such as, for example, magnetic or optical disk, magnetic or optical tape, CD-ROM, DVD, RAM, EPROM, ROM or other semiconductor memory. A processor may employ continuous signals, periodically sampled signals, and/or any combination thereof. If a processor is distributed, two or more portions of the processor may communicate with one another through a communication link.

Unless stated otherwise, the term "processor" should be understood to include one processor or two or more cooperating processors.

Unless stated otherwise, the term "memory" should be understood to encompass a single memory or storage device or two or more memories or storage devices.

Unless stated otherwise, "code" may include, but is not limited to, instructions in a high-level language, low-level language, machine language and/or other type of language or combination thereof.

Unless stated otherwise, a program may include, but is not limited to, instructions in a high-level language, low-level language, machine language and/or other type of language or combination thereof.

Unless stated otherwise, an application is any type of program.

Unless stated otherwise, a "communication path" may comprise any type(s) of communication link(s), for example, but not limited to, wired links (e.g., conductors, fiber optic cables) or wireless links (e.g., acoustic links, radio links, microwave links, satellite links, infrared links or other electromagnetic links) or any combination thereof, each of which may be public and/or private, dedicated and/or shared. In some embodiments, a communication link may employ a protocol or combination of protocols including, for example, but not limited to the Internet Protocol.

Unless stated otherwise, information may include data and/or any other type of information (including, for example, but not limited to, one or more instructions to be executed by a processor), and may be in any form, for example, but not limited to, analog information and/or digital information in serial and/or in parallel form. Information may or may not be divided into blocks.

Unless stated otherwise, terms such as, for example, "comprises," "has," "includes," and all forms thereof, are considered open-ended, so as not to preclude additional elements and/or features.

Also unless stated otherwise, terms such as, for example, "a" and "one" are considered open-ended, and do not mean "only a" and "only one", respectively.

Also, unless stated otherwise, the phrase "a first" does not, by itself, require that there also be a "second."

Also unless stated otherwise, terms such as, for example, "in response to" and "based on" mean "in response at least to" and "based at least on," respectively, so as not to preclude being responsive to and/or based on, more than one thing.

As may be recognized by those of ordinary skill in the pertinent art based on the teachings herein, numerous changes and modifications may be made to the above-described and other embodiments of the present invention without departing from its scope as defined, for example, in the appended claims. For example, the smart device or smart switch may take the form of any of numerous different smart devices or smart switches that are currently known, or that later become known. Accordingly, this detailed description of embodiments is to be taken in an illustrative, as opposed to a limiting sense.

What is claimed is:

1. A system comprising:
a mount coupleable to a smart device;
a cover releasably attachable to the mount; and
at least one fastener configured to attach the mount against an unopened surface of a wall or other structure without penetrating the unopened surface,
wherein when the mount is coupled to the smart device and the cover is releasably attached to the mount, the smart device is positioned on a surface of the mount such that the smart device is visible through an opening defined by the cover,
wherein the mount defines a catch to releasably retain the smart device to the mount.

2. The system of claim 1, wherein the at least one fastener comprises an at least partly adhesive fastener coupled to the mount and coupleable to the unopened surface of the wall or other structure.

3. The system of claim 2, wherein the at least partly adhesive fastener comprises: a substrate having a front surface and a back surface, the front surface coupled to the mount, the back surface facing away from the mount; and a pressure sensitive adhesive disposed on at least a portion of the back surface.

4. The system of claim 2, further comprising: a tab attached to the at least partly adhesive fastener, the tab configured to be pulled to apply at least a shear force to the at least partly adhesive fastener and thereby cause release of the at least one fastener from the unopened surface of the wall or other structure.

5. The system of claim 4, wherein the tab extends through an opening defined by the mount.

6. The system of claim 5, further comprising: a door releasably attachable to the mount, wherein when the door is attached to the mount, the door covers the tab; and wherein when the door is removed from the mount, the tab is visible through the opening defined by the mount.

7. The system of claim 1, wherein the mount comprises: a level indicator configured to indicate an angular position or orientation of at least one portion of the mount relative to one or more of parallel or plumb to a force of gravity.

8. The system of claim 1, wherein the catch comprises one or more magnetic components.

9. The system of claim 1, wherein the mount defines one or more seats configured to accommodate one or more batteries configured to supply electrical power to the smart device.

10. A method comprising:
coupling a smart device to a mount such that the smart device is positioned on a surface of the mount;
subsequent to coupling the smart device to the mount, releasably attaching a cover to the mount such that the smart device is visible through an opening defined by the cover; and
attaching the mount to an unopened surface of a wall via at least one fastener without penetrating the unopened surface,
wherein coupling the smart device to the mount comprises coupling a catch of the smart device to a catch of the mount to releasably couple the smart device to the mount.

11. The method of claim 10, wherein the at least one fastener comprises an at least partly adhesive fastener coupled to the mount.

12. The method of claim 11, wherein attaching the mount to the unopened surface of the wall comprises applying a pressure to the at least partly adhesive fastener.

13. The method of claim 11, further comprising: pulling a tab to apply a shear force to the at least partly adhesive fastener to release the at least partly adhesive fastener from the unopened surface of the wall.

14. A smart device assembly, comprising:
- a smart device;
- a mount coupleable to the smart device;
- a cover releasably attachable to the mount; and
- at least one fastener configured to attach the mount against an unopened surface of a wall or other structure without penetrating the unopened surface,
- wherein when the mount is coupled to the smart device and the cover is releasably attached to the mount, the smart device is positioned on a surface of the mount such that the smart device is visible through an opening defined by the cover,
- wherein the mount defines one or more seats configured to accommodate one or more batteries configured to supply electrical power to the smart device.

15. The smart device assembly of claim 14, wherein the smart device includes a smart switch configured to control power delivery to at least one device or appliance.

16. The smart device assembly of claim 15, wherein the smart switch is configured to communicate with the at least one device or appliance via a wireless network.

17. The smart device assembly of claim 14, wherein at least one of the smart device and the mount define a catch to releasably retain the smart device to the mount.

* * * * *